(12) United States Patent
Stuiver

(10) Patent No.: US 12,168,190 B2
(45) Date of Patent: Dec. 17, 2024

(54) SELF-CLEANING FILTER

(71) Applicant: CECO ENVIRONMENTAL IP INC., Dallas, TX (US)

(72) Inventor: Jan Stuiver, De Knipe (NL)

(73) Assignee: CECO ENVIRONMENTAL IP INC., Dallas, TX (US)

( * ) Notice: Subject to any disclaimer, the term of this patent is extended or adjusted under 35 U.S.C. 154(b) by 481 days.

(21) Appl. No.: 17/616,597

(22) PCT Filed: Jun. 5, 2020

(86) PCT No.: PCT/US2020/036402
§ 371 (c)(1),
(2) Date: Dec. 3, 2021

(87) PCT Pub. No.: WO2020/247806
PCT Pub. Date: Dec. 10, 2020

(65) Prior Publication Data
US 2022/0233978 A1    Jul. 28, 2022

Related U.S. Application Data

(63) Continuation-in-part of application No. 16/432,706, filed on Jun. 5, 2019.

(51) Int. Cl.
*B01D 29/66* (2006.01)
*B01D 29/15* (2006.01)
(Continued)

(52) U.S. Cl.
CPC ............ *B01D 29/66* (2013.01); *B01D 29/15* (2013.01); *B01D 29/52* (2013.01); *B01D 29/70* (2013.01); *B01D 29/94* (2013.01)

(58) Field of Classification Search
None
See application file for complete search history.

(56) References Cited

U.S. PATENT DOCUMENTS 2,131,312 A * 9/1938 Colton ...................... C09C 1/06
423/104
2,690,493 A * 9/1954 Schaefer ................ B23K 9/324
209/148

(Continued)

FOREIGN PATENT DOCUMENTS

BE         650998 A      9/1956
CH       0631352 A5      8/1982

(Continued)

OTHER PUBLICATIONS

Foreign Communication from a Related Counterpart—International Preliminary Report on Patentability, dated Dec. 16, 2021, PCT/US2020/036402, filed on Jun. 5, 2020.

(Continued)

*Primary Examiner* — Robert J Popovics
(74) *Attorney, Agent, or Firm* — Andrew M. Metrailer; Michael W. Piper; Conley Rose, P.C.

(57) ABSTRACT

Embodiments relate generally to a self-cleaning filter. A filter may include a tube comprising perforations. The tube may be configured to receive a flow of a liquid from a first direction or a flow of a gas from a second direction opposite to the first direction. The filter may also include a filter media positioned concentrically around the tube, and spacers positioned between the tube and the filter media to create a space between the tube and the filter media. A portion of the filter media is configured to flex inward into the space during the flow of liquid into the filter, and flex outward from the space during the flow of gas exiting the filter.

20 Claims, 26 Drawing Sheets

(51) Int. Cl.
    *B01D 29/52*     (2006.01)
    *B01D 29/70*     (2006.01)
    *B01D 29/94*     (2006.01)

(56) References Cited

U.S. PATENT DOCUMENTS

| | | | | |
|---|---|---|---|---|
| 2,766,360 | A * | 10/1956 | Landis | B23K 9/186 |
| | | | | 219/73 |
| 3,042,214 | A * | 7/1962 | Arvanitakis | B01D 35/16 |
| | | | | 210/330 |
| 3,100,190 | A * | 8/1963 | Hobson, Jr. | B01D 29/52 |
| | | | | 210/497.1 |
| 3,276,594 | A | 10/1966 | Gwilliam | |
| 3,291,310 | A * | 12/1966 | Marvel | B01D 29/21 |
| | | | | 210/167.13 |
| 3,323,647 | A * | 6/1967 | Ogden | B23K 9/324 |
| | | | | 228/41 |
| 3,326,382 | A * | 6/1967 | Bozek | B01D 29/66 |
| | | | | 210/489 |
| 3,394,532 | A * | 7/1968 | Octiker | F16K 31/385 |
| | | | | 55/467 |
| 3,481,479 | A * | 12/1969 | Terhune | B01D 29/66 |
| | | | | 210/489 |
| 3,750,889 | A | 8/1973 | Acosta | |
| 3,804,245 | A * | 4/1974 | Pendleton | B23K 9/324 |
| | | | | 209/318 |
| 3,834,535 | A * | 9/1974 | Portyrata | B01D 29/15 |
| | | | | 210/108 |
| 3,853,509 | A * | 12/1974 | Leliaert | B01D 46/71 |
| | | | | 55/378 |
| 3,898,415 | A * | 8/1975 | D'Acremont | B23K 9/324 |
| | | | | 219/73 |
| 3,926,788 | A * | 12/1975 | Stephens | B01D 46/02 |
| | | | | 209/250 |
| 4,051,033 | A | 9/1977 | Blace | |
| 4,064,049 | A | 12/1977 | Calvano | |
| 4,077,467 | A * | 3/1978 | Spigarelli | B23K 1/015 |
| | | | | 134/107 |
| 4,158,629 | A * | 6/1979 | Sawyer | B01D 33/0323 |
| | | | | 210/414 |
| 4,165,218 | A * | 8/1979 | Vanhumbeeck | C25D 21/14 |
| | | | | 436/51 |
| RE30,399 | E * | 9/1980 | Ammann | B23K 1/015 |
| | | | | 228/180.1 |
| 4,221,957 | A * | 9/1980 | Barger | B23K 9/324 |
| | | | | 219/73 |
| 4,225,441 | A * | 9/1980 | Muller | B01D 29/15 |
| | | | | 210/483 |
| 4,242,007 | A * | 12/1980 | Ogden | B65G 53/4691 |
| | | | | 406/126 |
| 4,244,505 | A * | 1/1981 | Stokes, Jr | B23K 35/3603 |
| | | | | 134/13 |
| 4,259,095 | A * | 3/1981 | Johnson, Jr. | B01D 46/48 |
| | | | | 55/379 |
| 4,324,571 | A * | 4/1982 | Johnson, Jr. | B01D 46/0041 |
| | | | | 55/379 |
| 4,333,893 | A * | 6/1982 | Clyde | B01J 19/30 |
| | | | | 210/150 |
| 4,342,897 | A * | 8/1982 | Murai | B23K 9/324 |
| | | | | 55/315 |
| 4,378,296 | A * | 3/1983 | Carlson, Jr. | B01D 37/00 |
| | | | | 210/187 |
| 4,380,431 | A * | 4/1983 | Carlson, Jr. | B23K 1/015 |
| | | | | 392/398 |
| 4,403,949 | A * | 9/1983 | March | B01D 35/22 |
| | | | | 62/123 |
| 4,433,986 | A * | 2/1984 | Borst | B01D 46/04 |
| | | | | 96/428 |
| 4,443,346 | A * | 4/1984 | Muller | B01D 29/668 |
| | | | | 210/791 |
| 4,455,222 | A * | 6/1984 | Less | B07B 9/00 |
| | | | | 55/300 |
| 4,473,472 | A * | 9/1984 | Muller | B01D 29/92 |
| | | | | 210/458 |
| 4,525,275 | A | 6/1985 | Ostlund | |
| 4,592,847 | A * | 6/1986 | Schumacher | B01D 29/80 |
| | | | | 210/186 |
| 4,604,201 | A * | 8/1986 | Muller | B01D 29/19 |
| | | | | 210/323.2 |
| 4,622,144 | A | 11/1986 | Janecek et al. | |
| 4,652,369 | A * | 3/1987 | DePolo | B01D 29/21 |
| | | | | 210/356 |
| 4,684,544 | A * | 8/1987 | Arnett | B23K 3/082 |
| | | | | 228/31 |
| 4,714,557 | A | 12/1987 | Croket | |
| 4,738,786 | A | 4/1988 | Wykoff | |
| 4,759,835 | A * | 7/1988 | Klinkowski | B01D 29/661 |
| | | | | 204/520 |
| 4,792,078 | A * | 12/1988 | Takahashi | B23K 3/082 |
| | | | | 228/8 |
| 5,032,272 | A * | 7/1991 | Mould | B01D 46/06 |
| | | | | 210/486 |
| 5,042,249 | A | 8/1991 | Erdmannsdoerfer | |
| 5,139,686 | A * | 8/1992 | Cares | B01D 29/15 |
| | | | | 210/791 |
| 5,156,325 | A * | 10/1992 | Mishina | B23K 1/015 |
| | | | | 228/234.1 |
| 5,179,282 | A * | 1/1993 | Modinger | B23K 35/3612 |
| | | | | 228/8 |
| 5,199,965 | A * | 4/1993 | van Ackeren | B01D 46/76 |
| | | | | 55/299 |
| 5,320,756 | A * | 6/1994 | Winston | C02F 1/5236 |
| | | | | 134/40 |
| 5,320,758 | A * | 6/1994 | Winston | C02F 1/5236 |
| | | | | 134/40 |
| 5,333,774 | A * | 8/1994 | Mishina | B23K 1/015 |
| | | | | 228/222 |
| 5,334,291 | A * | 8/1994 | Gavlin | B01D 3/02 |
| | | | | 159/901 |
| 5,500,132 | A | 3/1996 | Elmi | |
| 5,578,208 | A * | 11/1996 | Miki | B01D 29/21 |
| | | | | 210/493.5 |
| 5,639,369 | A * | 6/1997 | Bowlsbey | B01D 29/15 |
| | | | | 210/497.2 |
| 5,639,954 | A * | 6/1997 | Crothers | B23K 1/203 |
| | | | | 73/1.01 |
| 5,693,383 | A | 12/1997 | Basse et al. | |
| 5,772,870 | A | 6/1998 | Basse | |
| 5,800,580 | A * | 9/1998 | Feldt | B01D 46/06 |
| | | | | 55/378 |
| 5,871,641 | A * | 2/1999 | Davidson | B01D 29/21 |
| | | | | 210/167.13 |
| 5,882,510 | A | 3/1999 | Basse et al. | |
| 5,882,528 | A * | 3/1999 | Davidson | B01D 29/21 |
| | | | | 210/791 |
| 5,972,228 | A | 10/1999 | Ingelman et al. | |
| 5,993,500 | A * | 11/1999 | Bailey | B23K 1/008 |
| | | | | 55/385.6 |
| 6,041,944 | A * | 3/2000 | Meier | B01D 29/925 |
| | | | | 210/489 |
| 6,056,796 | A * | 5/2000 | Chiang | B01D 46/2407 |
| | | | | 55/482 |
| 6,120,585 | A * | 9/2000 | Inomata | B23K 1/012 |
| | | | | 96/377 |
| 6,132,621 | A * | 10/2000 | Sprang | C22B 3/42 |
| | | | | 210/672 |
| 6,146,448 | A * | 11/2000 | Shaw | B23K 1/008 |
| | | | | 55/467 |
| 6,309,552 | B1 * | 10/2001 | Hobson, Jr. | B01D 29/52 |
| | | | | 210/791 |
| 6,365,054 | B1 | 4/2002 | Kruger et al. | |
| 6,439,273 | B1 * | 8/2002 | Kruger | B01D 29/114 |
| | | | | 141/69 |
| 6,485,696 | B1 * | 11/2002 | Sato | C02F 1/78 |
| | | | | 423/127 |
| 6,694,637 | B2 * | 2/2004 | Miller, Jr. | B23K 1/008 |
| | | | | 34/79 |

(56) References Cited

U.S. PATENT DOCUMENTS

| | | | | |
|---|---|---|---|---|
| 6,709,586 B2* | 3/2004 | Mason | B01D 29/96 | 210/411 |
| 6,860,394 B1* | 3/2005 | Mueller | B01D 29/66 | 210/489 |
| 6,875,346 B2* | 4/2005 | Fox | B01D 29/96 | 210/493.1 |
| 7,077,968 B2* | 7/2006 | Pfeiffer | B01D 36/04 | 210/803 |
| 7,241,383 B2 | 7/2007 | Katano | | |
| 7,708,183 B2* | 5/2010 | Dautenhahn | B23K 1/012 | 432/128 |
| 8,110,015 B2* | 2/2012 | Neiderman | B23K 1/008 | 95/288 |
| 8,128,720 B2* | 3/2012 | Neiderman | B23K 1/018 | 55/385.6 |
| 8,177,975 B2* | 5/2012 | Schipper | B01D 21/0012 | 96/155 |
| 8,187,352 B2* | 5/2012 | Schumann | B01D 46/08 | 55/378 |
| 8,197,680 B2* | 6/2012 | Sharir | B01D 29/902 | 210/113 |
| 8,303,682 B2* | 11/2012 | Nowak | B01D 46/06 | 95/1 |
| 8,309,711 B2* | 11/2012 | Wiley | B01D 29/94 | 210/411 |
| 8,940,099 B2* | 1/2015 | Ngai | F27B 9/34 | 134/4 |
| 8,951,411 B2* | 2/2015 | Sharir | B01D 29/822 | 210/111 |
| 9,170,051 B2* | 10/2015 | Ngai | B23K 1/012 | |
| 9,221,003 B2* | 12/2015 | Schumann | B01D 46/06 | |
| 9,662,731 B2* | 5/2017 | Ngai | F27D 7/04 | |
| 9,770,685 B2* | 9/2017 | Krueger | B01D 46/71 | |
| 10,058,803 B2* | 8/2018 | Li | B01D 29/54 | |
| 10,316,400 B1* | 6/2019 | Cullivan | C23C 2/325 | |
| 11,091,828 B2* | 8/2021 | Cullivan | C23C 2/325 | |
| 11,679,347 B2* | 6/2023 | McFarlen | B01D 29/52 | 210/455 |
| 2002/0070181 A1 | 6/2002 | Deanda et al. | | |
| 2003/0164342 A1* | 9/2003 | Mason | B01D 29/114 | 210/323.2 |
| 2004/0168986 A1 | 9/2004 | Katano | | |
| 2005/0155925 A1 | 7/2005 | Schipper | | |
| 2009/0250385 A1* | 10/2009 | Sharir | B01D 29/902 | 210/143 |
| 2011/0031192 A1 | 2/2011 | Wiley | | |
| 2011/0067370 A1* | 3/2011 | Schumann | B01D 46/08 | 55/492 |
| 2012/0305460 A1* | 12/2012 | Sharir | B01D 29/822 | 210/106 |
| 2012/0324842 A1* | 12/2012 | Schumann | B01D 46/08 | 55/303 |
| 2014/0158544 A1* | 6/2014 | Ou | C23C 18/54 | 205/99 |
| 2017/0015572 A1* | 1/2017 | Casey | C12M 23/02 | |
| 2017/0072344 A1* | 3/2017 | Powell | B01D 29/66 | |
| 2017/0173501 A1 | 6/2017 | Li | | |
| 2019/0249287 A1* | 8/2019 | Cullivan | C23C 2/30 | |
| 2020/0384388 A1* | 12/2020 | Stuiver | B01D 29/52 | |
| 2021/0101811 A1* | 4/2021 | Casey | B01D 65/02 | |
| 2022/0233978 A1* | 7/2022 | Stuiver | B01D 29/52 | |
| 2023/0001335 A1* | 1/2023 | Powell | B01D 29/66 | |

FOREIGN PATENT DOCUMENTS

| | | |
|---|---|---|
| CH | 655859 A5 | 6/1993 |
| DE | 4235316 A1 | 6/1993 |
| DE | 19528360 A1 | 2/1997 |
| EP | 0077086 A2 | 4/1983 |
| EP | 1243303 A1 | 9/2002 |
| WO | 2000016875 A2 | 3/2000 |
| WO | 2017103893 A1 | 6/2017 |
| WO | 2020247806 A1 | 12/2020 |

OTHER PUBLICATIONS

Restriction Requirement dated Aug. 25, 2021, U.S. Appl. No. 16/432,706, filed Jun. 5, 2019.

Office Action dated Nov. 12, 2021, U.S. Appl. No. 16/432,706, filed Jun. 5, 2019.

Foreign Communication from a Related Counterpart—Preliminary International Search Report, dated Sep. 18, 2020, PCT/US2020/036402, filed on Jun. 5, 2020.

Foreign Communication from a Related Counterpart—International Search Report and Written Opinion, dated Nov. 12, 2020, PCT/US2020/036402, filed on Jun. 5, 2020.

* cited by examiner

SELF-CLEANING FILTER

CROSS-REFERENCE TO RELATED APPLICATIONS

This application is a filing under 35 U.S.C. 371 as the National Stage of International Application No. PCT/US2020/036402, filed on Jun. 5, 20202, entitled, "SELF-CLEANING FILTER," which claims the benefit of and claims priority to as a continuation-in-part and as the international application of U.S. patent application Ser. No. 16/432,706, filed on Jun. 5, 2019 and entitled "Self-Cleaning Filter," both of which are incorporated herein by reference in their entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Industrial fluid filters may be utilized across various industries such as oil and gas, power generation, water and waste water, battery production, food processing, metals plating and galvanizing, and chemical processing. For instance, one type of fluid filter includes a vessel with an inlet for receiving a fluid to be filtered and an outlet for discharging a filtered fluid from the vessel.

SUMMARY

In an embodiment, a filter may include: a tube comprising perforations, the tube configured to receive a flow of a gas from a first direction or a flow of a liquid from a second direction opposite to the first direction; a filter media positioned concentrically around the tube; and spacers positioned between the tube and the filter media to create a space between the tube and the filter media; wherein a portion of the filter media is configured to flex inward into the space during the flow of liquid into the filter, and flex outward from the space during the flow of gas exiting the filter.

In an embodiment, a filter may include: a plurality of tubes, each tube comprising perforations and each tube configured to receive a flow of a gas from a first direction or a flow of a liquid from a second direction opposite to the first direction; and a filter media positioned concentrically around the tubes to form a space between two tubes and a portion of the filter media; wherein the portion of the filter media is configured to flex inward into the space during the flow of liquid into the filter, and flex outward from the space during the flow of gas exiting the filter.

In an embodiment, a method may include: receiving liquid in a vessel including a filter; receiving the liquid in the filter from a first direction, wherein the filter comprises: a tube including perforations; a filter media positioned concentrically around the tube; and spacers positioned between the tube and the filter media to create a space between the tube and the filter media. The method may further include: flexing a portion of the filter media inward into the space upon receipt of the liquid; accumulating filter cake with the filter media; receiving gas into the filter from a second direction opposite to the first direction; and flexing the portion of the filter media outward from the space upon receipt of the gas, to remove the filter cake from the filter media.

In an embodiment, a method may include receiving liquid in a vessel including a filter; receiving the liquid in the filter from a first direction, wherein the filter comprises: a plurality of tubes, each tube comprising perforations; and a filter media positioned concentrically around the tubes to form a space between two tubes and a portion of the filter media. The method may further include flexing the portion of the filter media inward into the space upon receipt of the liquid; accumulating filter cake with the filter media; receiving gas in the filter from a second direction opposite to the first direction; and flexing the portion of the filter media outward from the space upon receipt of the gas, to remove the filter cake from the filter media.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
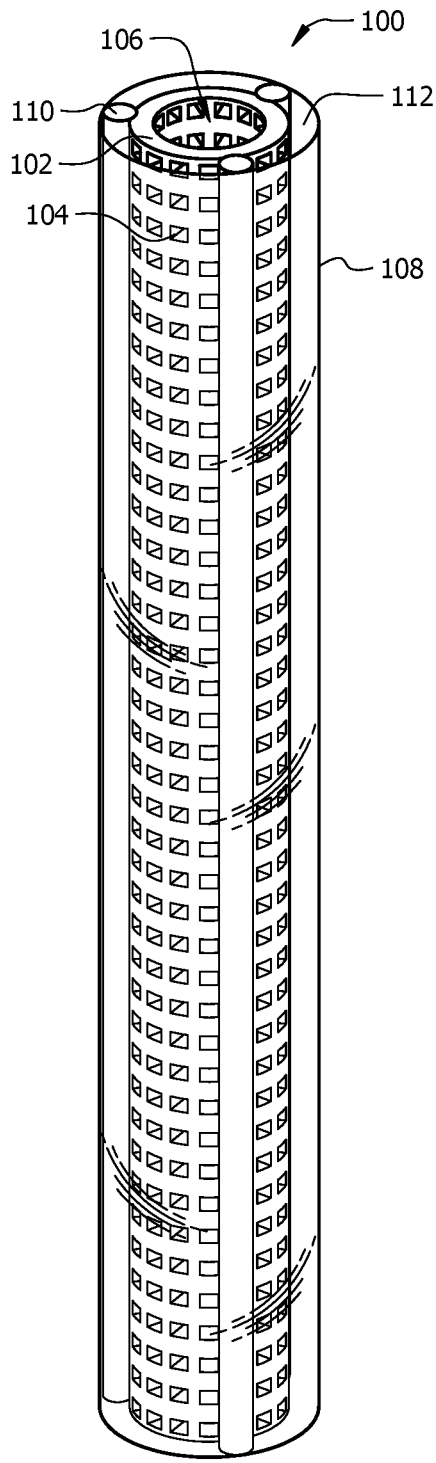
FIG. 1A illustrates a self-cleaning filter, in accordance with an embodiment of the disclosure.

The present disclosure relates generally to a self-cleaning filter. A variety of filtration media can be used to filter fluids in various industries that rely on filters to clean fluids. In some industries, filtration assemblies can use discs of filtration media retained by filter plates. The fluid that is being filtered can enter into a central space and flow outwards through the stacked discs of filtration media and filter plates that retain the filtration media in position. When the filtration media is saturated with the components being filtered, the entire filter assembly is removed to allow the filtration media to be replaced. This can entail removing the entire stack of filtration media discs and the filtration plates while the filtration media is saturated with the liquid. This process is time consuming and can expose workers to harmful chemicals. Once the filtration media discs are replaced, the entire assembly can then be replaced for further filtration. The use of filtration media discs results in a large amount of waste. In addition to the components that are filtered from the fluid, the filtration media in the discs is generally discarded as well. When the liquid being filtered is still present in the filtration media discs, there is a loss of potentially valuable liquid as well.

Other filter structures can include filter cartridges in which filtration media is maintained. The media being filtered can be passed through the filtration cartridges, and once saturated, the entire filter cartridges can be removed and discarded. This can generate large amounts of waste that can include the filter cartridge, the component being filtered, and additional fluids retained within the filtration media.

Disclosed herein is a self-cleaning filter assembly that reduces the amount of waste produced by the filter assembly while also reducing the exposure of the workers to the liquid being filtered. The self-cleaning filter may include a filter tube having a filtration media disposed around the filter tube. In some embodiments, a reinforcement core and/or a volume reducer can be disposed within the filter tube to aid in self-cleaning by reducing a volume of a chamber to receive air or another gas to allow for cleaning of the filter media. Due to its configuration, the self-cleaning filter can have a surface area selected to allow a large flow of fluid to enter the self-cleaning filter, where the surface area can be as large as needed for the specific filter design. As the self-cleaning filter assembly is used, the components to be removed from a liquid can form a filter cake on the exterior of the filtration media.

Once the filter cake is to be removed, the filter assembly can be drained of the liquid being filtered. The filter cake can then be dried in place, thereby further removing the liquid being filtered and reducing the amount of material that is disposed of from the filter. The filter assembly can then be back-pulsed with gas to remove the filter cake. As described in more detail below, the shape of the filter tube can be selected through various designs to have a non-smooth surface. The filtration of the fluid and formation of the filter cake can then result in a non-round shape that can be expanded by the back-pulsing of gas. The expansion can result in the dried filter cake dislodging from the filtration media breaking off of and fall from the filtration media, thereby cleaning the filtration media. The dried filter cake can then be collected and disposed of separately from the filtration media, which can be reused. This system reduces the total volume of waste, while also allowing for the removal of the components removed from the fluid without the need for workers to handle the removed components directly.

Figure 1B:
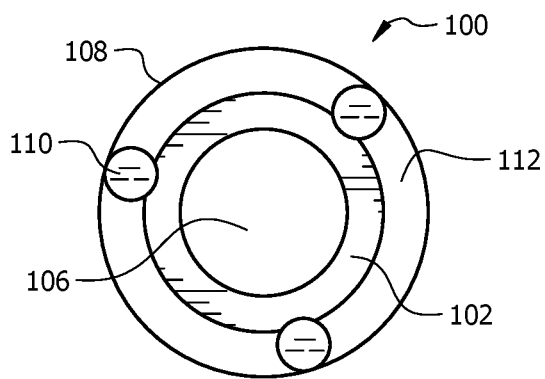
FIG. 1B is a top view/bottom view of the self-cleaning filter shown on FIG. 1A, in accordance with an embodiment of the disclosure.
Figure 2A:
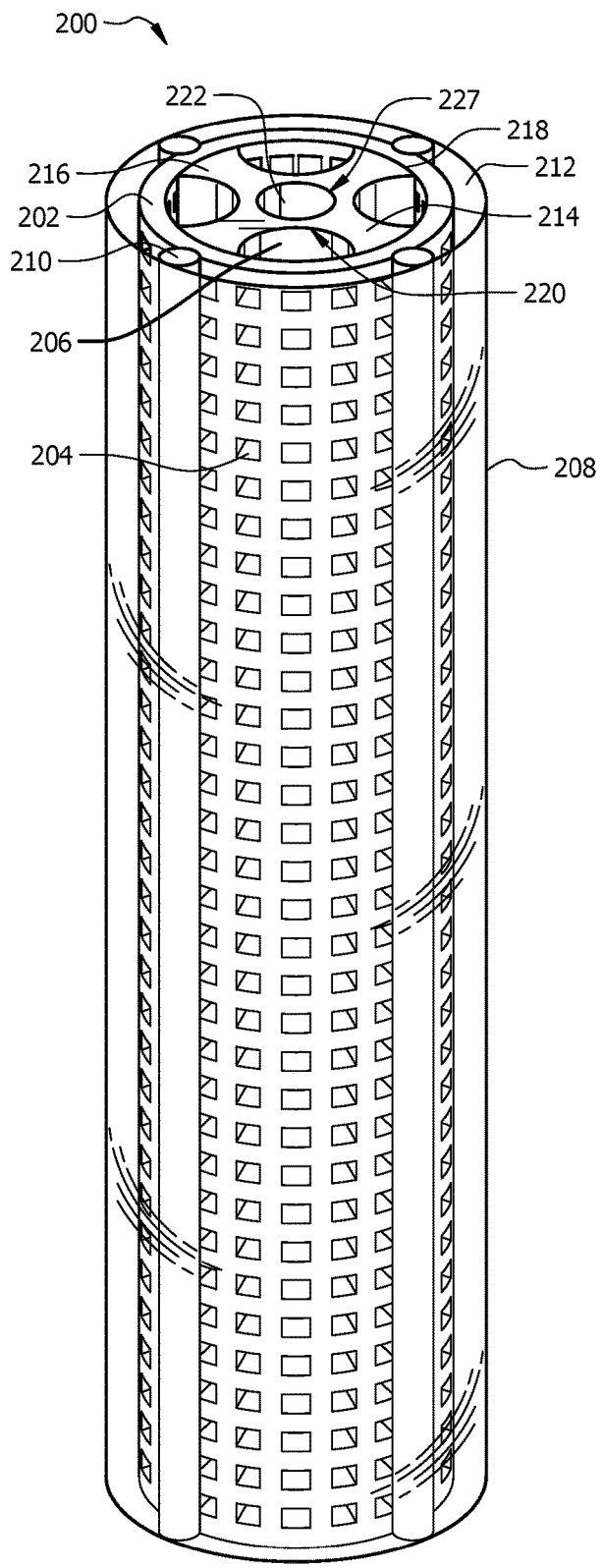
FIG. 2A illustrates a self-cleaning filter with a reinforcement core, in accordance with an embodiment of the disclosure.
Figure 2B:
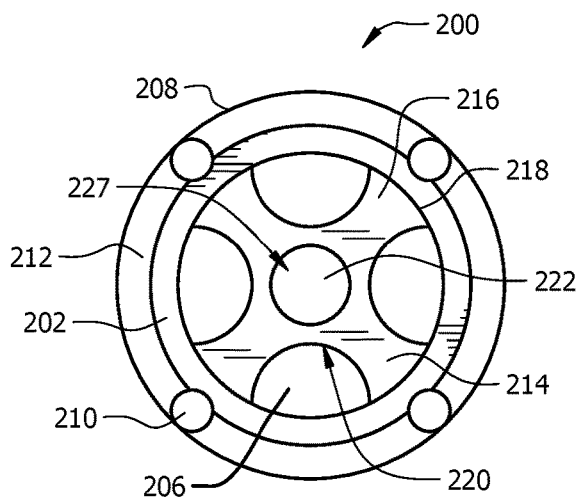
FIG. 2B is a top view/bottom view of the self-cleaning filter shown on FIG. 2A, in accordance with an embodiment of the disclosure.
Figure 2C:
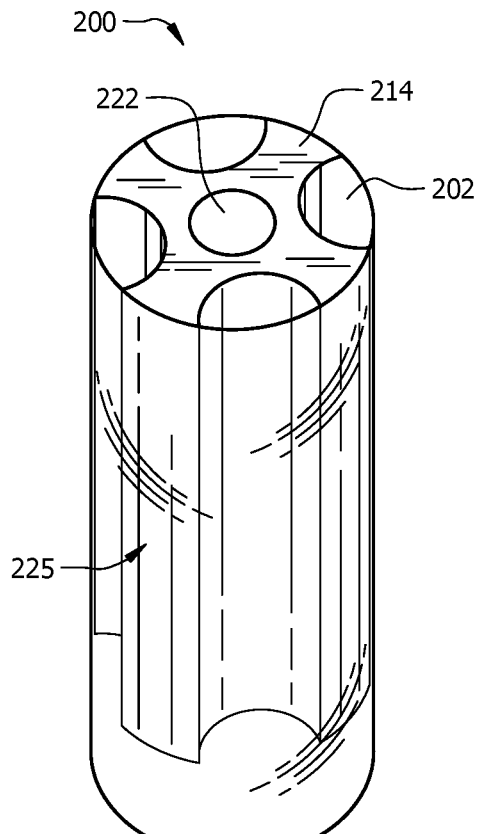
FIG. 2C is another view of the self-cleaning filter shown on FIG. 2A, in accordance with an embodiment of the disclosure.
Figure 2D:
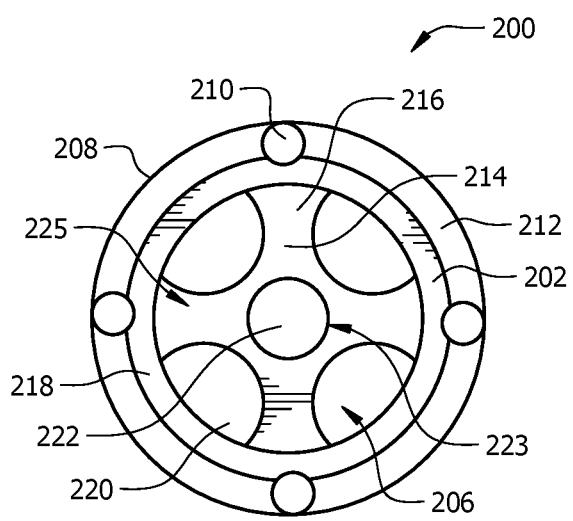
FIG. 2D is a bottom view of the self-cleaning filter shown on FIG. 2A, in accordance with an embodiment of the disclosure.

FIGS. 1A and 1B illustrate a self-cleaning filter 100 with a single tube 102 ("tube 102"). The tube 102 serves as a structural support for the filter media 108. For example, when fluid flows from outside of the filter media 108 into the center of the tube 102, the tube 102 holds the flexible filter media 108 and retains the filter media 108 in position while the fluid is filtered. The tube can have a plurality of openings or perforation 104 to allow fluid to flow into the center of the tube 102. The perforations 104 are flow passages that may be arranged in columns and rows. While shown as a tube 102 having a round cross section, the tube can have other cross-sectional shapes depending on the use of the filter and the filtering conditions.

The tube 102 can have any suitable diameter and length. The size of the tube 102 can be selected to provide a filtering area, which based on the type of filter media 108, suitable for the use for filtering a type and flow rate of fluid. In some embodiments, the tube 102 may have a length ranging from about 250 millimeters (mm) to about 3000 mm, or between about 500 mm and about 2000 mm. In some embodiments, a radius, r, of tube 102 may range from about 8 mm to about 120 mm, or from about 16 mm to about 80 mm.

The tube 102 may be made of any suitable material that has the proper structural strength and/or is inert to the fluids being filtered. In some embodiments, the tube 102 can be made of metals or alloys (e.g., steel, stainless steel, etc.), a composite material, polymers (e.g. polypropylene, polyvinylidene fluoride (PVDF), etc.), polymer coated or lined metal (e.g., a rubber lined vessel), or the like. In some embodiments, the tube 102 can be formed from a plastic such as polypropylene. When the tube 102 is formed from plastic, as may be needed when working with certain fluids such as corrosive solutions, the structural strength of the material can be an issue. This can create unique challenges for the designs of the self-cleaning filter 100 and the tube 102 based on certain factors such as when the size of the tube 102 is increased, the operating temperature increases, and/or the pressure differentials increases. The configurations of the filters as disclosed herein can then be used to allow for the filters to be scaled up while still maintaining the structural integrity needed for various operating conditions.

The central opening in the tube can define a chamber 106 positioned within tube 102, where the chamber 106 can be in fluid communication with perforations 104. The chamber 106 may extend along the length of tube 102. The chamber 106 serves as a fluid passageway for fluids during filtering and cleaning, where the chamber may fill with filtered liquid during operation of self-cleaning filter 100 and a gas during cleaning of the self-cleaning filter 100.

The filter media 108 may be positioned concentrically about/around the tube 102 and may extend along the length of the tube 102. The filter media 108 serves to remove one or more materials within a fluid flow as the fluid flows through the filter media 108. The filter media 108 may be a flexible material capable of being formed into tubes, sheets, and/or rolls. Examples of such materials can include, but are not limited to, paper, polypropylene, cellulose, polytetrafluoroethylene, tetrafluoroethylene, and other synthetic materials. The porosity and/or thickness of the filter sheet may be selected depending on the materials desired to be removed from the fluid. Examples of porosities may range from about 0.5 micron to about 200 microns. Examples of thicknesses of the filter media 108 may range from about 0.5 millimeter (mm) to about 3 millimeter. A surface area of the filter media 108 may range from about 0.05 to about 0.8, or from about 0.1 to about 0.5 meters squared ($m^2$) per meter-length of the filter media along an axial direction of the tube 102. The filter media 108 (and filter 100) may be configured to receive fluid to be filtered at a flow rate ranging from 0 cubic meters per hour ($m^3/h$) to 200 $m^3/h$, or up to about 125 $m^3/h$. The filter media 108 can have a diameter that is slightly larger than that of the tube 102 to allow the filter media to be placed over the tube 102 and any spacers 110. In some embodiments, the filter media 108 can have a diameter between about 40 mm and about 250 mm, or from about 50 mm to about 210 mm.

One or more spacers 110 can be positioned around the tube 102 and between the filter media 108 and the tube 102. The spacers 110 serve to shape the filter media 108 during use while allowing the filter media 108 to expand during a cleaning cycle of the self-cleaning filter 100. The presence of additional material made by the filter media may allow for a void or space 112 to be formed between the tube 102 and the filter media 108 due to the presence of spacers 110 during cleaning cycle. During filtering, the spacers 110 allow filter media 108 to deform inward (during a flow-in of liquid to be filtered) into space 112. During this process, a filter cake or layer can be formed on an outside of the filter media 108. In some embodiments, the filter media 108 may adhere/stick to tube 102 during the in-flow of the liquid to be filtered. During the in-flow, filter cake may form on filter media 108. In order to remove this filter cake, the filter media 108 may be popped/pushed outward quickly with a gas flow during the flow-out to remove or break off filter cake that has accumulated and adhered to filter media 108, as described in more detail herein.

In some embodiments, the spacers 110 may be in the form of rods and extend along the length of tube 102 and filter media 108. While shown as having a round cross-section, the spacers 110 can also have other cross-section shapes such as half-circle, triangular, square, or the like. In some embodiments, the spacers can have a diameter in a range from about 5 mm to about 40 mm, or from about 10 mm to about 25 mm. In some embodiments, a ratio of the diameter, s, of each spacer 110 to the inner diameter of the tube 102 may range from about 0.06:1 to about 0.9:1, or between about 0.06:1 to about 0.8:1. Any suitable number of spacers can be used around the tube 102. Spacers 110 may be made of a material that is suitable for the environment in which the filter is used such as metals or alloys (e.g., steel, stainless steel, etc.), polymers (e.g. polypropylene, polyvinylidene fluoride (PVDF), etc.), polymer coated or lined metal (e.g., a rubber lined vessel), or the like. In some embodiments, the spacers 110 can be formed from any of the materials used to form the tube 102, and in some embodiments, the spacers can be formed using the same materials as the tube 102.

FIGS. 2A-2D illustrate a self-cleaning filter 200 with a single tube 202 ("tube 202"). The tube 202 may be the same or similar to the tube described with respect to FIGS. 1A and 1B, and the size and materials can be used with tube 202. The self-cleaning filter 200 can be similar to the self-cleaning filter 100, with the exception of the presence of a reinforcement core 214 and/or additional spacers 210, and like components can be the same or similar to those described with respect to the self-cleaning filter 100.

A chamber 206 may be formed and defined by an inner surface of the tube 202 and an outer surface of the reinforcement core 214. The chamber 206 is in fluid communication with the perforations 204 within the tube 202. The chamber 206 may include free space/volume within the tube 202 that is not occupied by a reinforcement core 214. The chamber 206 may extend along the length of tube 202, and may fill with filtered liquid during a filtering operation of self-cleaning filter 200. In some embodiments, the reinforcement core 214 may reduce the interior volume of the tube 202 by an amount of at least about 10%, 20%, 30%, 40%, or 50%. In some embodiments, the reinforcement core 214 may reduce the interior volume of the tube 202 by an amount of equal to or less than 99%, 95%, 90%, 80%, or 70%. In some embodiments, the reinforcement core 214 may reduce the interior volume of the tube 202 by an amount between any of the lower amounts and any of the upper amounts.

The filter media 208 may be positioned concentrically about/around tube 202 and may extend along the length of tube 202. The filter media 208 can include any of the filter media described with respect to the self-cleaning filter 100. A surface area of the filter media 108 may range from about 0.05 to about 0.8, or from about 0.1 to about 0.5 meters squared ($m^2$) per meter-length of the filter media along an axial direction of the tube 102. The filter media 108 (and filter 100) may be configured to receive fluid to be filtered at a flow rate ranging from 0 cubic meters per hour ($m^3/h$) to 200 $m^3/h$, or up to about 125 $m^3/h$.

As with the filter media 208, the spacers 210 can be the same or similar to the spacers 110, and any of the spacers described with respect to the self-cleaning filter 100 can be used with the self-cleaning filter 200. Similarly, the tube 202 can be the same or similar to the tube 102, including any of the materials of construction and sizes as described above.

As shown, the self-cleaning filter 200 can include a reinforcement core 214. The reinforcement core 214 can serve a number of functions including helping to reduce the total volume of the chamber 206 as well as providing reinforcement within the tube 202 to provide structural support during use in a filtering process. The reinforcement core 214 ("core 214") may be made of any suitable material, including those that are inert to the fluid being filtered. In some embodiments, the reinforcement core 214 can be formed from metals or alloys (e.g., steel, stainless steel, etc.), a composite material, polymers (e.g. polypropylene, polyvinylidene fluoride (PVDF), etc.), polymer coated or lined metal (e.g., a rubber coated materials), or the like. The reinforcement core 214 may be positioned concentrically within tube 202 and may extend partially or entirely along the length of tube 202, as shown on FIG. 2C.

In some embodiments, the reinforcement core 214 may be positioned within the chamber 206 to reduce the volume or free space within the chamber 206. A reduction in the amount of free space in the chamber 206 can reduce the amount and/or volume of a gas needed to expand the filter media during a cleaning process, as described in more detail herein.

The reinforcement core 214 may also include support portions 216 that extend outwards from the center of the tube 202 and contact the interior of the tube 202 to support tube 202 (e.g., prevent deformation of tube 202 during in-flow (filtering) of liquid or out-flow-out (e.g., self-cleaning) of gas). The support portions 216 and the spacers 210 can have any relative alignments around the perimeter of the tube 202. In some embodiments, the segments 218 of tube 202 may be positioned between support portions 216 and spacers 210, such that the segments 218 can be radially aligned with the spacers 210. This configuration may allow the spacers 210 to be supported by the segments 218 during use. However, this alignment is optional and not necessary in all embodiments The reinforcement core 214 may include recessions 220 positioned between the support portions 216. The recessions 220 may extend lengthwise along the reinforcement core 214 and may provide fluid flow pathways that fill with filtered liquid as liquid passes through the filter media 208 and the perforations 204. Also, the reinforcement core 214 may include a central passage 222 extending lengthwise through a center of the reinforcement core 214. During use, the filtered liquid can enter the passage 222 via an inlet 223 positioned at an end 225 (a bottom) of the reinforcement core 214, as shown on FIGS. 2C and 2D. After the filtered fluid enters the passage 222, the filtered fluid may exit the passage 222 via an outlet 227 into a receptacle for filtered fluid, as shown on FIG. 2B.

Figure 3B:
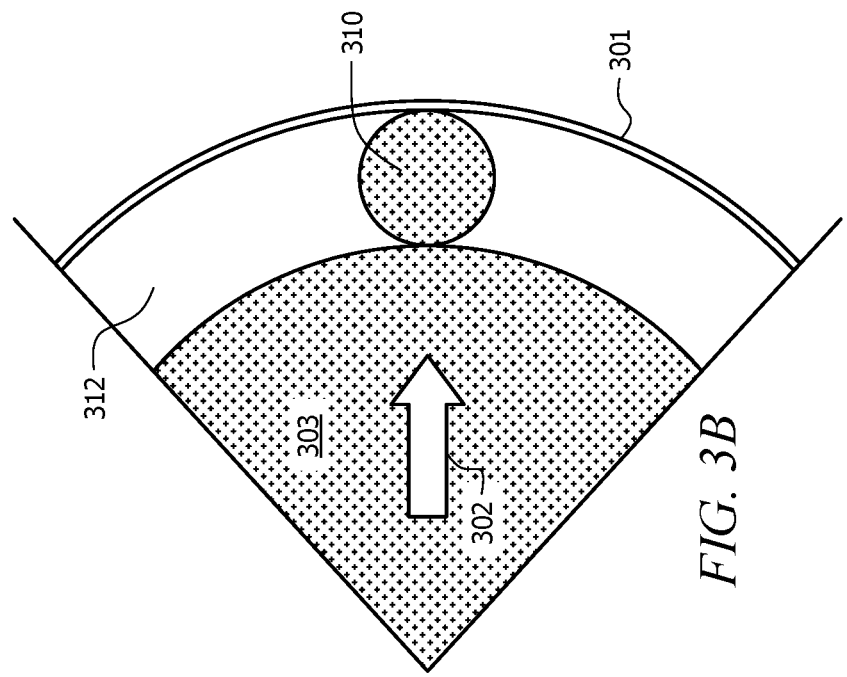
FIGS. 3A and 3B illustrate flexing of a filter media, in accordance with an embodiment of the disclosure.
Figure 3A:
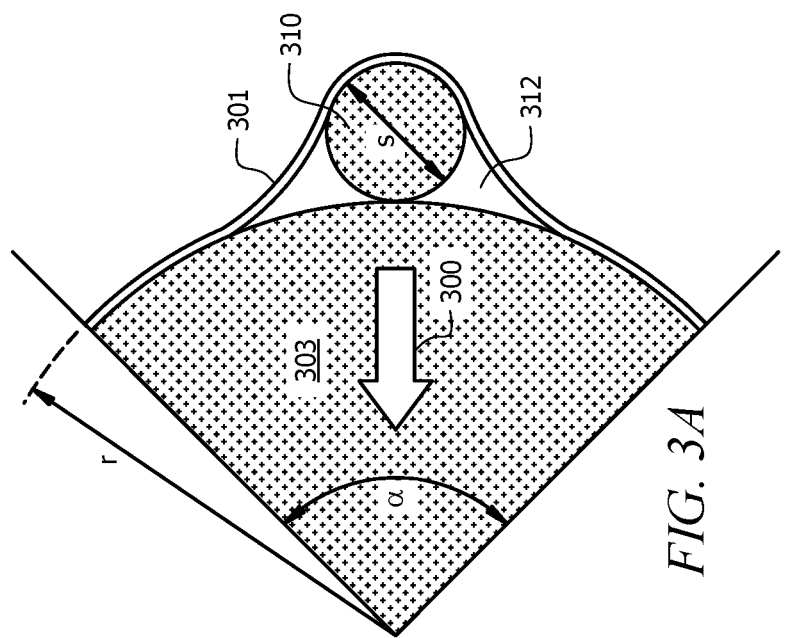

FIG. 3A illustrates a top view of a filter media 301. The filter media 301 may be a particular embodiment of the filter media 108 or the filter media 208 during the flow-in period (filtering period). As shown, as a fluid enters the filter media 301 from an exterior of the self-cleaning filter and into the interior of the tube, the filter media 301 moves/flexes inward due to the flow/pressure of the fluid being filtered, and the filter media 301 may contact and be biased towards an outside surface of tube 303 and/or spacer 310 that may include the tube 102 or 202, as shown. A space 312 can be formed between the spacer, the exterior surface of the tube, and the inner surface of the filter media 301. The flow of entering fluid during a filtering process is depicted by the arrow 300. The spacer 310 may be a particular implementation of the spacer 110 or the spacer 210. The space 312 may be a particular implementation of space 112 or 212.

FIG. 3B illustrates a top view of filter media 301 during the out-flow period (e.g., during a self-cleaning period or process) after the in-flow period shown on FIG. 3A. In this process, a gas can be introduced into an interior of the tube and flow outwards through the filter media. As shown, as a gas (e.g., a purging gas, a cleansing gas, etc.) pressurizes the filter media 301, the filter media 301 moves/flexes outward from the space 312 (due to the flow/pressure of the gas exiting the tube) and may rebound or move back substantially to a pre-filtering/initial physical form. The flow of exiting gas is depicted by the arrow 302. The self-cleaning period allows for the gas to exit the filter media the tube, thereby flexing (in an outward direction) the filter media 301. This flexing results in a removal/dropping of any filter cake that has formed on and/or adhered to filter media 301.

Figure 4A:
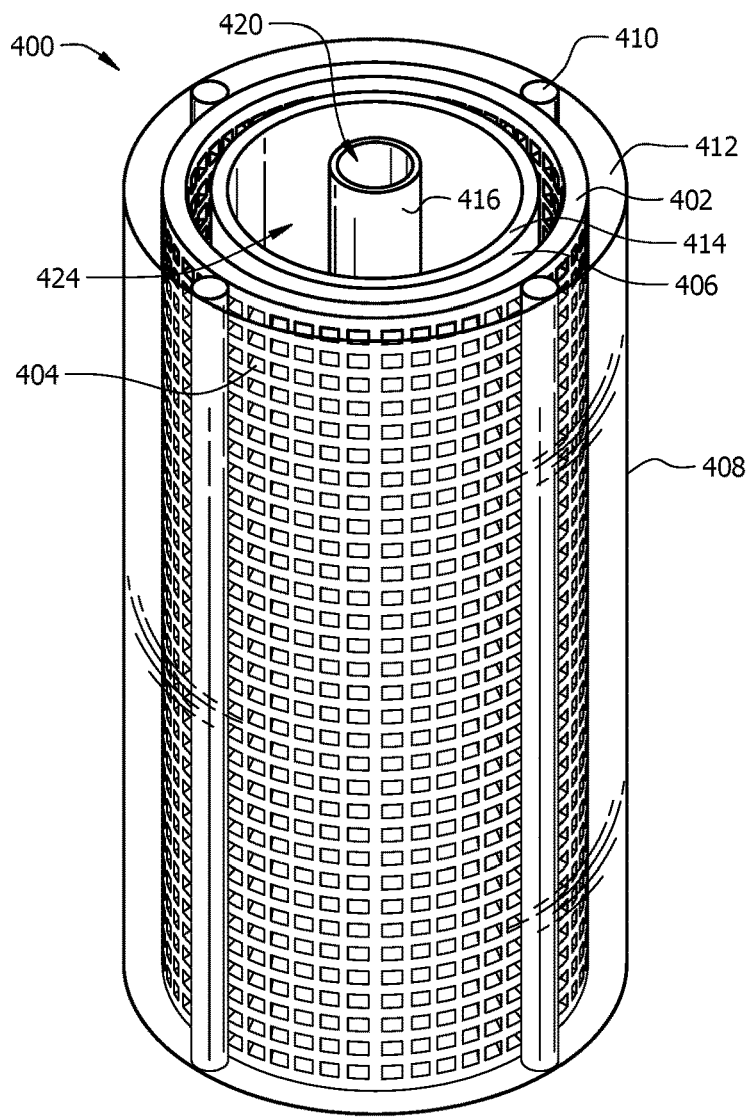
FIG. 4A illustrates a self-cleaning filter, in accordance with an embodiment of the disclosure.
Figure 4B:
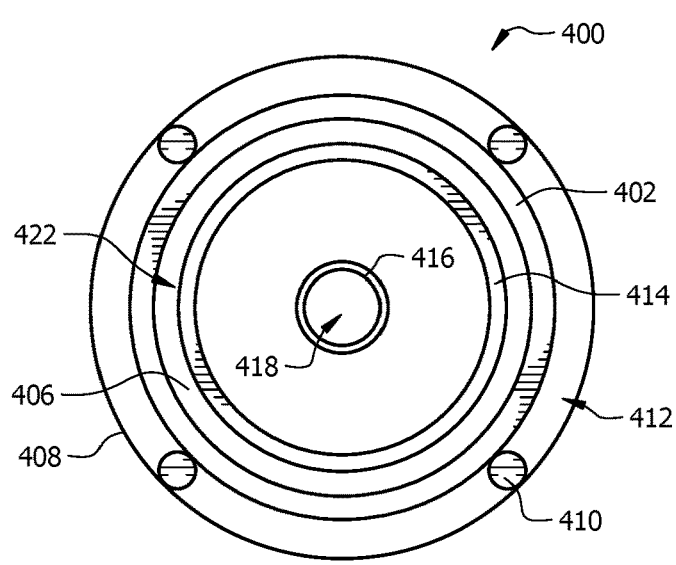
FIG. 4B is a top view/bottom view of the self-cleaning filter shown on FIG. 4A, in accordance with an embodiment of the disclosure.

FIGS. 4A and 4B illustrate an embodiment of a self-cleaning filter 400 with a single tube 402 ("tube 402"). The self-cleaning filter 400 is similar to the self-cleaning filters 100 and 200, and similar components can be the same or similar to the components described with respect to the self-cleaning filters 100 and 200. The main difference between the self-cleaning filter 400 and the self-cleaning filters 100 and 200 is the volume reducer 414.

The tube 402 may be the same or similar to the tubes described with respect to the self-cleaning filters 100 and 200. In some embodiments, the tube 402 may have a length ranging from about 250 millimeters (mm) to about 3000 mm, or between about 500 mm and about 2000 mm. In some embodiments, a radius, r, of tube 402 may range from about 50 mm to about 300 mm, or from about 60 mm to about 200 mm. The tube 402 may be perforated as described with respect to the tubes described with respect to the self-cleaning filters 100 and 200.

The chamber 406 can be defined by an inner surface of the tube 402 and formed within tube 402. The chamber 406 is in fluid communication with an exterior of the tube 402 and filter media 408 via the perforations 404. The chamber 406 may extend along the length of the tube 402, and may include free or unoccupied space within the tube 402.

The filter media 408 can be the same as the filter media described with respect to the self-cleaning filter 100 or the self-cleaning filter 200. The filter media 408 may be positioned concentrically about/around tube 402 and may extend along the length of tube 402. The filter media 408 can have a diameter that is slightly larger than that of the tube to allow the filter media to be placed over the tube 402 and any spacers 410. In some embodiments, the filter media 408 can have a diameter between about 150 mm to about 500 mm, or from about 165 mm to about 480 mm. A surface area of the filter media 408 may range from about 0.2 to about 1.5, or from about 0.4 to about 1.3 meters squared ($m^2$) per meter-length of the filter media along an axial direction of the tube 402. The filter media 408 may be configured to receive fluid to be filtered at a flow rate ranging from 0 cubic meters per hour ($m^3/h$) to 200 $m^3/h$, or up to about 125 $m^3/h$.

The spacers 410 can be the same as the spacers described with respect to the self-cleaning filter 100 or the self-cleaning filter 200. In some embodiments, the spacers 410 can have a diameter in a range from about 10 mm to about 60 mm, or from about 20 mm to about 40 mm. In some embodiments, a ratio of the diameter, s, of each spacer 110 to the inner diameter of the tube 102 may range from about 0.03:1 to about 0.8:1, or between about 0.05:1 to about 0.5:1

As shown, the self-cleaning filter 400 can include a volume reducer 414. The volume reducer 414 is similar to the reinforcement core described herein in that the volume reducer 414 serves to reduce the volume within the chamber 406. The volume reducer 414 may be of a cylindrical shape and may partially or fully extend along the length of tube 402, similar to the reinforcement core 214 as shown on FIG. 2C. The volume reducer 414, similar to the reinforcement core 214, also reduces a volume of free space that can be occupied by a fluid. The volume reducer 414 may include a passage 416 passing therethrough. In some embodiments, the volume reducer 414 may reduce the interior volume of the chamber 406 by an amount of at least about 10%, 20%, 30%, 40%, or 50%. In some embodiments, the volume reducer 414 may reduce the interior volume of the chamber 406 by an amount of equal to or less than 99%, 95%, 90%, 80%, or 70%. In some embodiments, the volume reducer 414 may reduce the interior volume of the chamber 406 by an amount between any of the lower amounts and any of the upper amounts.

In use of the self-cleaning filter 400, liquids containing contaminants can pass through filter media 408 from an exterior of the self-cleaning filter 400 into an interior of the tube 402 via the perforations 404 of tube 402, thereby filtering at least a portion of the contaminants as the fluid passes through the filter media 408. The filtered fluid can pass between the interior of the tube 402 and an exterior of the volume reducer 414 (see the arrow 413 in FIG. 4C). The filtered liquid can then enter (see the arrow 413) the passage 416 (e.g., a tube) via an inlet 418 (see FIGS. 4B and 4C). The filtered liquid may then pass through the passage 416 and can exit (see arrow 415) passage 416 via an outlet 420, which can be in fluid communication with a receptacle for holding the filtered liquid. The end 422 (bottom end) of the volume reducer 414 may be sealed except for the inlet 418 and the passage 416. A space 424 (internal bore or internal chamber) within an interior of the volume reducer 414 and around/about passage 416 can be arranged with a filter housing using appropriate seals and the like to remain free of any liquid. This allows for a reduction in a volume/free space within tube 402.

Figure 4C:
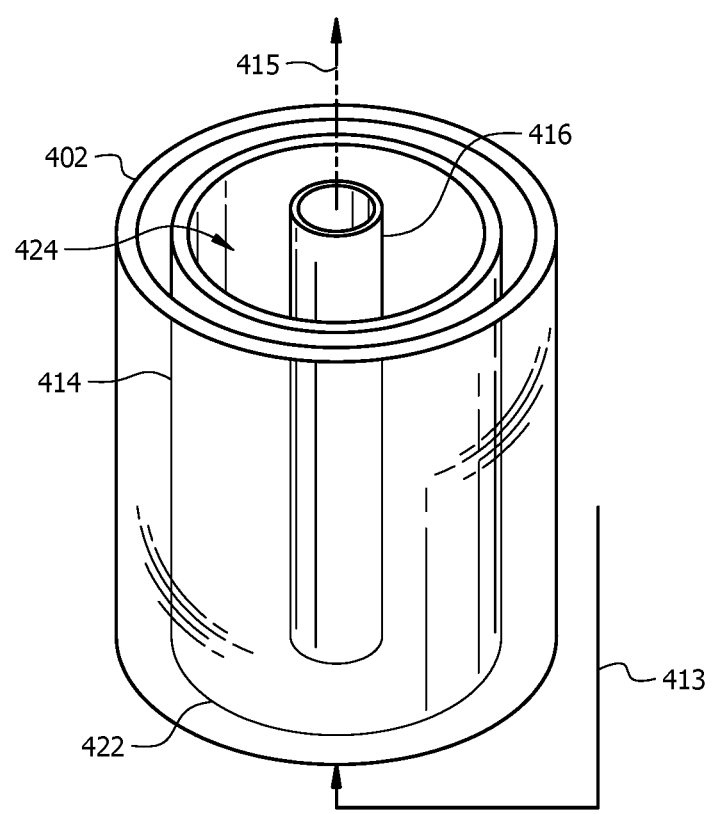
FIG. 4C is another view of the self-cleaning filter shown on FIG. 4A, in accordance with an embodiment of the disclosure.

As shown in FIGS. 4A-4C, the volume reducer 414 is placed within the tube 402, but may not contact an inner surface of the tube 402. The volume reducer 414 can be retained in position by one or more components of a filter housing, as described in more detail herein. Appropriate seals and connections can be present as part of the filter housing to allow the fluid to flow along predetermined flow pathways.

Figure 5A:
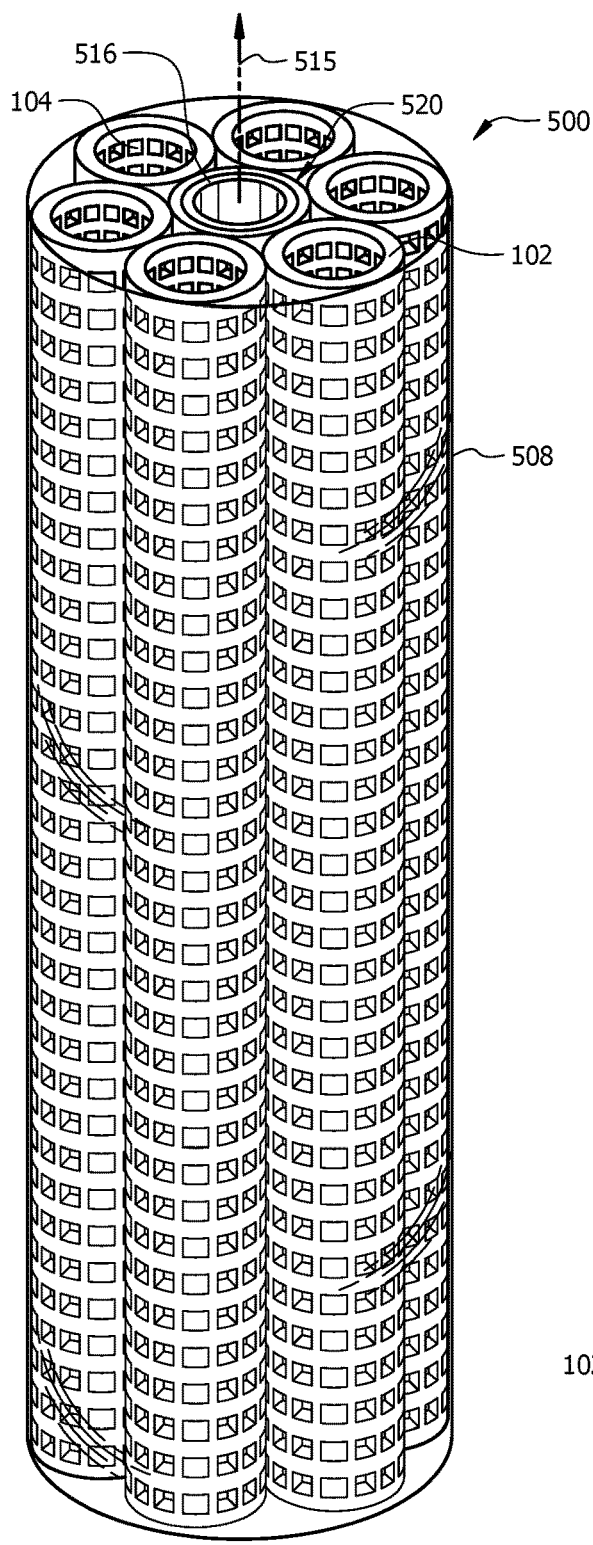
FIG. 5A illustrates a self-cleaning filter, in accordance with an embodiment of the disclosure.
Figure 5B:
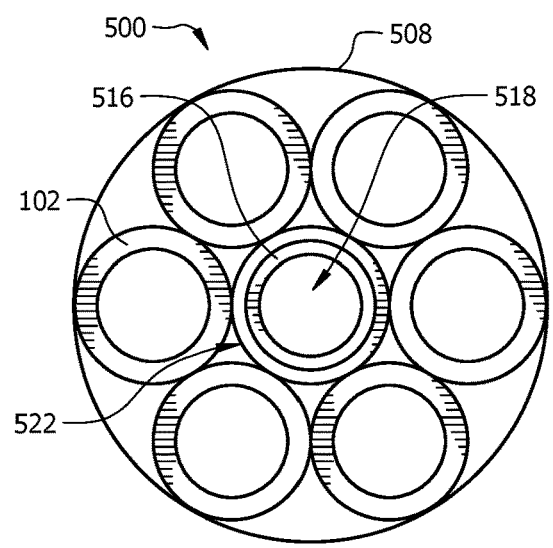
FIG. 5B is a top view/bottom view of the self-cleaning filter shown on FIG. 5A, in accordance with an embodiment of the disclosure.
Figure 5C:
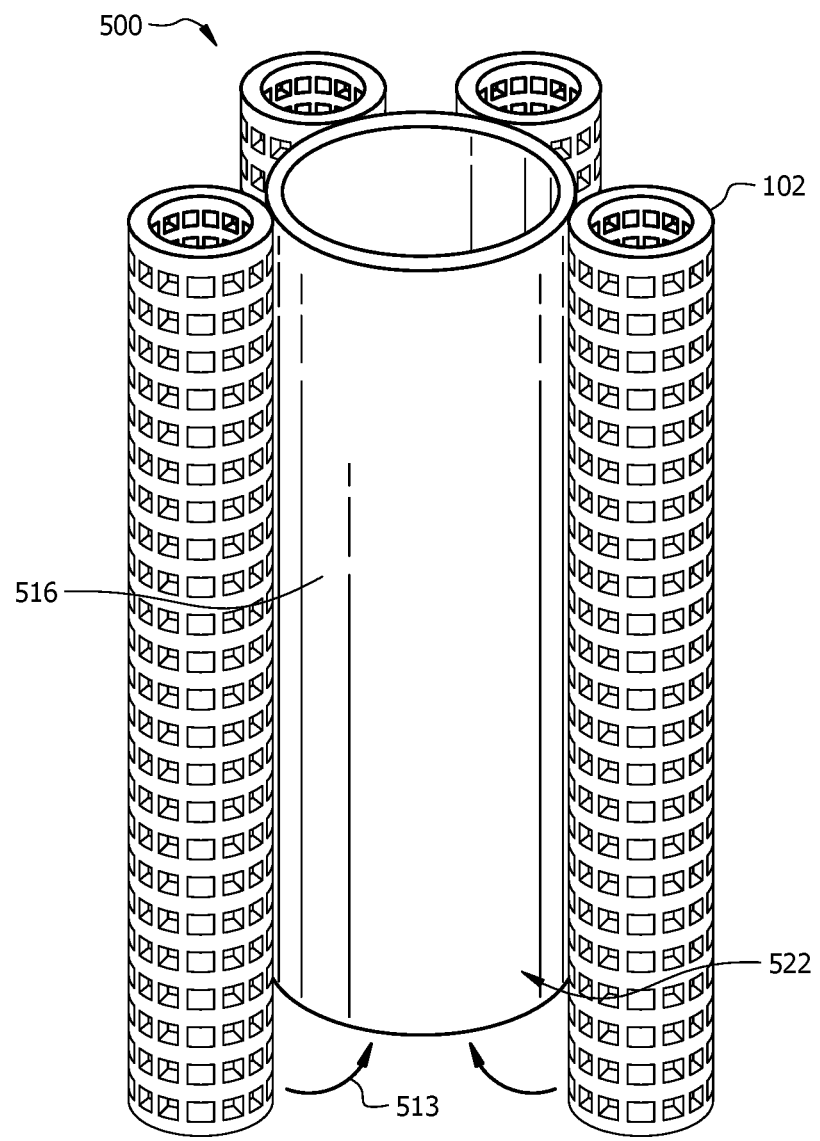
FIG. 5C is another view of the self-cleaning filter shown on FIG. 5A, in accordance with an embodiment of the disclosure.

FIGS. 5A-5C illustrate self-cleaning filter 500 with multiple tubes 102, as described above (see FIGS. 1A and 1B). The self-cleaning filter 500 has components similar to those described with respect to the self-cleaning filters 100, 200, 400, and the same or similar components may have the same reference numbers. In some embodiments, multiple tubes 102 (e.g., a plurality of tubes 102) may be positioned about or around a passage 516 through a flow tube. The flow tube 516 may extend partially along the length of the tubes 102, as shown on FIG. 5C. In some embodiments, the flow tube 516 can extend along the entire length of the tubes, and one or more opening can be disposed in an end of the flow tube 516 to provide a fluid pathway into an interior of the flow tube 516. The use of multiple tubes 102 may provide the spacing to allow the filter media to contract and expand in response to the filtering process and cleaning process. As shown, the multiple tubes 102 may take the place of spacers in this embodiment as the outer profile of the tubes 102 serves as the spacers.

When multiple tubes 102 are present, the filter media 508 may be positioned concentrically about/around the tubes 102 and may extend along the length of the tubes 102. In some embodiments, the tube 102 may have a length ranging from about 250 millimeters (mm) to about 3000 mm, or between about 500 mm and about 2500 mm. In some embodiments, a radius, r, of tube 102 may range from about 8 mm to about 80 mm, or from about 10 mm to about 65 mm.

The filter media 508 may be the same or similar to any of the filter media as described herein. In some embodiments, the filter media 508 (and filter 500) may be configured to receive fluid to be filtered at a flow rate ranging from 0 m$^3$/h to 150 m$^3$/h. A surface area of the filter media 508 may range from about 0.05 to about 1.5, or from about 0.1 to about 1.2 meters squared (m$^2$) per meter-length of the filter media along an axial direction of the tube 102. The filter media 508 can have a diameter that is slightly larger than that of the tube to allow the filter media to be placed over the plurality of tubes 102. In some embodiments, the filter media 508 can have a diameter between about 40 mm to about 500 mm, or from about 50 mm to about 375 mm.

During a filtering process, contaminated liquid can pass through from an exterior of the self-cleaning filter 500, through the filter media 508, and through the perforations 104 of tubes 102 and/or into a space between the tubes 102 and an exterior of the flow tube 516. The filtered liquid can pass to an end of the flow tube 516 and enter (see arrows 513) the interior of the flow tube 516 via an inlet 518, as shown on FIGS. 5B and 5C. In some embodiments, the flow tube 516 can extend the entire length of the tubes 102, and one or more openings can be present to allow the filtered fluid to enter the interior of the flow tube 516. The filtered liquid may then pass through the flow tube 516 and exit (see arrow 515) the flow tube 516 via an outlet 520, which can be in fluid communication with a receptacle or flow pathway for holding the filtered liquid. FIG. 5B illustrates the end 522 (bottom end) of the flow tube 516. The self-cleaning filter 500 can be retained in position within a filter housing by one or more components of a filter housing, and appropriate seals and connections can be present as part of the filter housing to allow the fluid to flow along predetermined flow pathways.

Figure 6A:
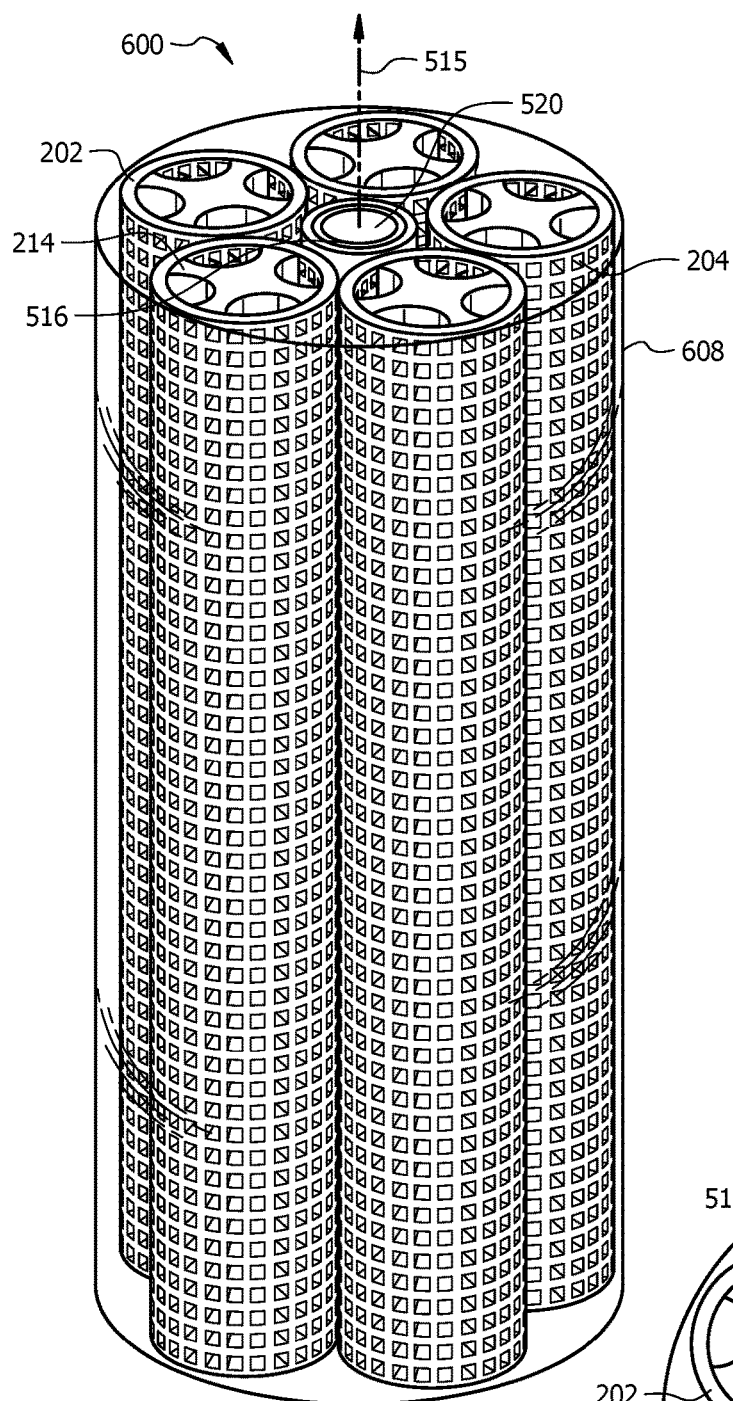
FIG. 6A illustrates a self-cleaning filter with a reinforcement core, in accordance with an embodiment of the disclosure.
Figure 6B:
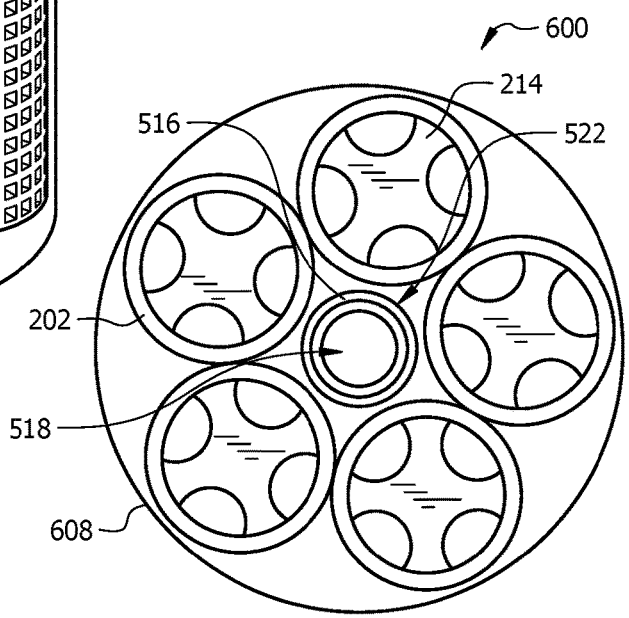
FIG. 6B is a top view/bottom view of the self-cleaning filter shown on FIG. 6A, in accordance with an embodiment of the disclosure.

FIGS. 6A and 6B illustrate a self-cleaning filter 600 with multiple tubes 202 including cores 214. The cores 214 can be the same or similar to the cores 214 described above (see FIGS. 2A and 2B). Further, the self-cleaning filter 600 having multiple tubes can be the same or similar to the self-cleaning filter 500 as described with respect to FIGS. 5A-5C, and similar components can be the same or similar. The filter media 608 may be positioned concentrically about/around tubes 202 and may extend along the length of tubes 202. The filter media 608 may be the same or similar to any of the filter media as described herein, including filter mediate 508. The cores 214 can be positioned within one or more of the tubes, and in some embodiments, all of the tubes 202. The cores 214 can serve to support the tubes 202 and/or reduce the interior volume within the tubes 202.

During a cleaning process, a liquid containing one or more contaminants to be filtered can pass through filter media 608 to remove at least a portion of the one or more contaminants. When being used for filtering the fluid, the filter media 608 can contact and conform to the outer surface of the tubes 202. The filtered liquid can pass into the tubes 202 via perforations 204 and/or into the space between the tubes and the flow tube 516. The filtered liquid can then enter the flow tube 516 via an inlet 518. The filtered liquid may then exit the flow tube 516 via an outlet 520, which can be in fluid communication with a receptacle for holding the filtered liquid. FIG. 6B illustrates the end 522 (bottom end) of the flow tube 516. The flow of liquid in this configuration is similar to the flow of liquid shown on FIGS. 5A-5C.

Figure 7B:
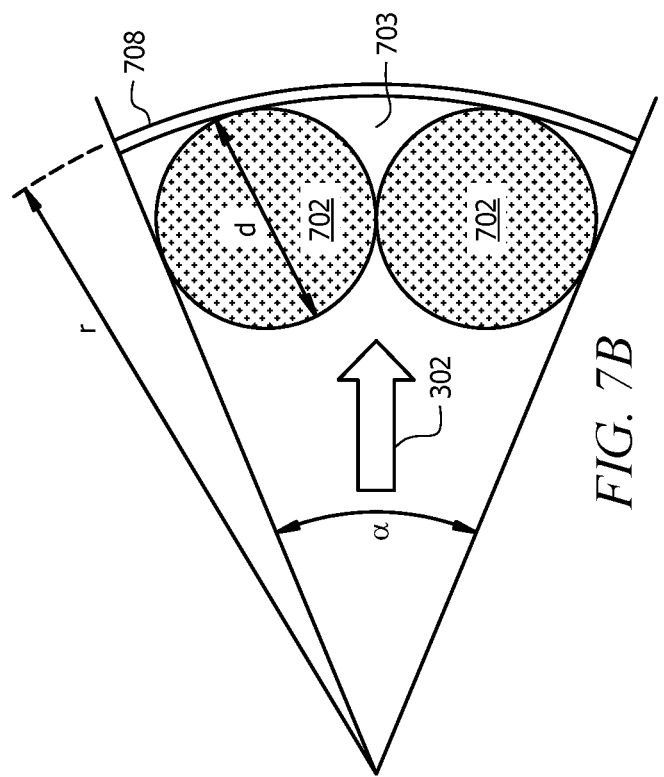
FIGS. 7A and 7B illustrate flexing of a filter media, in accordance with an embodiment of the disclosure.
Figure 7A:
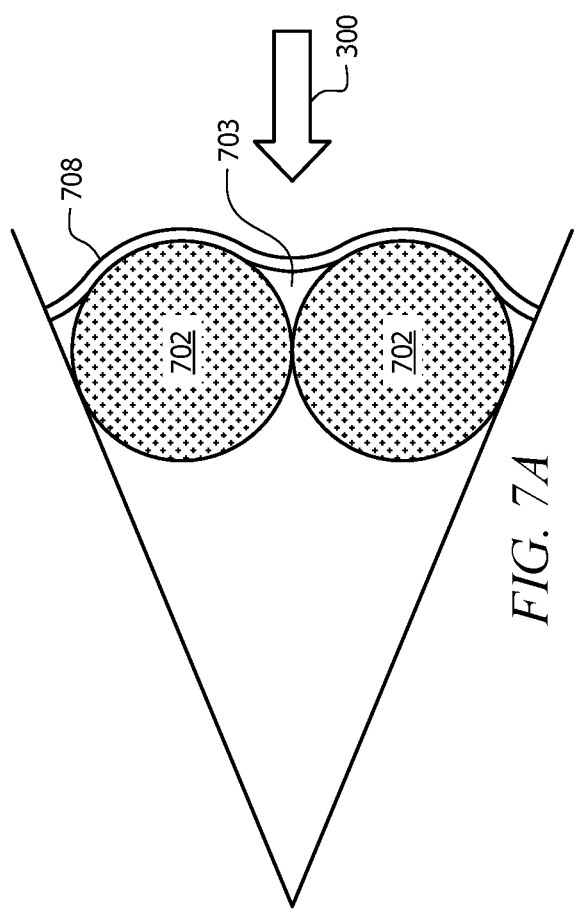

FIG. 7A illustrates a top, cross-section view of filter media 708. Filter media 708 may be a particular implementation of filter media 508 or 608 during the in-flow period or process, and the filter media 708 can include any of the filter media materials as described herein. As shown, as a fluid enters filter media 708, filter media 708 moves/flexes inward into space 703 due to flow/pressure of the fluid being filtered and may conform to and engage an outside surface of tubes 702 that may include tubes 102 or 202, as shown. The direction of flow of the entering fluid is depicted by arrow 300.

FIG. 7B illustrates a top, cross-sectional view of filter media 708 during the out-flow period (e.g., filter self-cleaning period). As shown, as a gas (e.g., a purging/cleansing gas) exits filter media 708, filter media 708 moves/flexes outward from space 703 due to flow/pressure of the exiting gas and move back substantially to a pre-filtering/initial physical form. The force to move the filter media 708 back to the initial form can be provided by the pressure drop across the filter media supplied by the gas. The flow direction of exiting gas is depicted by arrow 302 in FIG. 7B. The self-cleaning period allows for the gas to exit filter media 708, thereby flexing (in an outward direction) filter media 708. This flexing can result in a removal of at least a portion of any filter cake that has adhered to filter media 708.

The removal process can be enhanced by first drying the filter cake, as described in more detail herein.

Figure 8A:
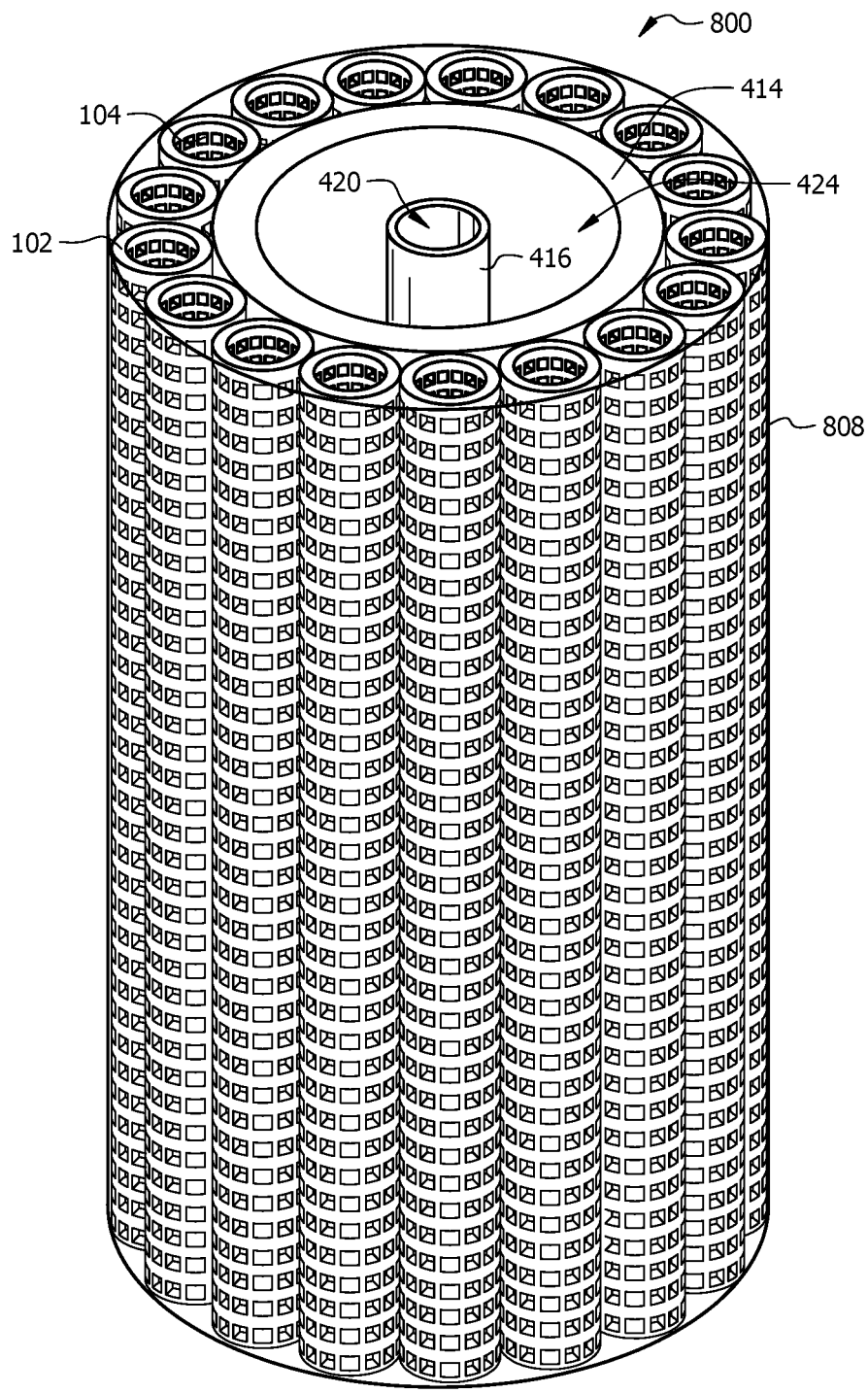
FIG. 8A illustrates a self-cleaning filter, in accordance with an embodiment of the disclosure.
Figure 8B:
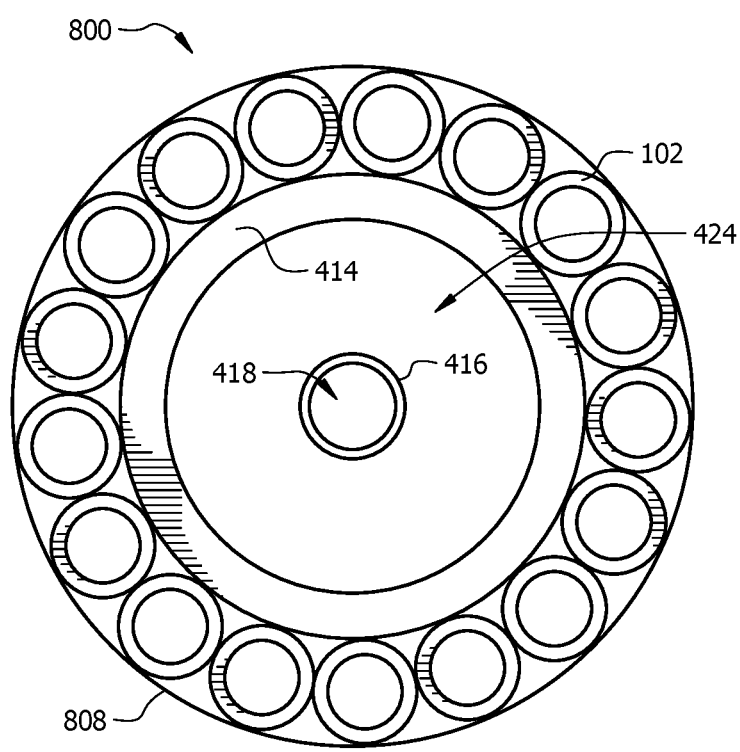
FIG. 8B is a top view/bottom view of the self-cleaning filter shown on FIG. 8A, in accordance with an embodiment of the disclosure.

FIGS. 8A and 8B illustrate an embodiment of a self-cleaning filter 800 with multiple tubes 102 and a volume reducer 414. The components of the self-cleaning filter 800 can be the same or similar to those described herein, for example as described above (e.g., see FIGS. 1A, 1B, 4A, 4B, and 4C). In some embodiments, the tube 102 may have a length ranging from about 250 millimeters (mm) to about 3000 mm, or between about 500 mm and about 2500 mm. In some embodiments, a radius, r, of tubes 102 may range from about 5 mm to about 60 mm, or from about 10 mm to about 45 mm. A surface area of the filter media 808 may range from about 0.2 to about 3, or from about 0.4 to about 2.25 meters squared ($m^2$) per meter-length of the filter media along an axial direction of the tube 102. The filter media 808 may be configured to receive fluid to be filtered at a flow rate ranging from 0 cubic meters per hour ($m^3/h$) to 300 $m^3/h$, or up to about 250 $m^3/h$. The filter media 808 can have a diameter that is slightly larger than that of the tube to allow the filter media to be placed over the tubes 102. In some embodiments, the filter media 808 can have a diameter between about 100 mm to about 750 mm, or from about 130 mm to about 680 mm. While a number of tubes 102 are shown, the number of tubes 102 an vary between about 5 tubes and about 40 tubes, between about 10 tubes and about 30 tubes, or between about 15 tubes and about 25 tubes, depending on the surface area needed and the overall size of the filter.

In use, a liquid comprising one or more contaminants can pass through the filter media 808 from an exterior of the self-cleaning filter 800 into the one or more tubes 102 and/or a space between the one or more tubes 102 and an exterior of the volume reducer 414 via the perforations 104 of the tubes 102. The filtered liquid enters the flow tube 416 via an inlet 418, shown on FIGS. 4B and 4C. The filtered liquid may then exit (see arrow 415 in FIG. 4C) the flow tube 416 via an outlet 420, which can be in fluid communication with a receptacle for holding the filtered liquid. The end 422 (bottom end) of the volume reducer 414 may be sealed except for the inlet 418 the flow tube passage 416. The space 424 within the volume reducer 414 and around/about the flow tube 416 can remain free of any liquid based on being retained in a filter housing. This allows for a reduction in a volume/free space within the self-cleaning filter 800.

Figure 8D:
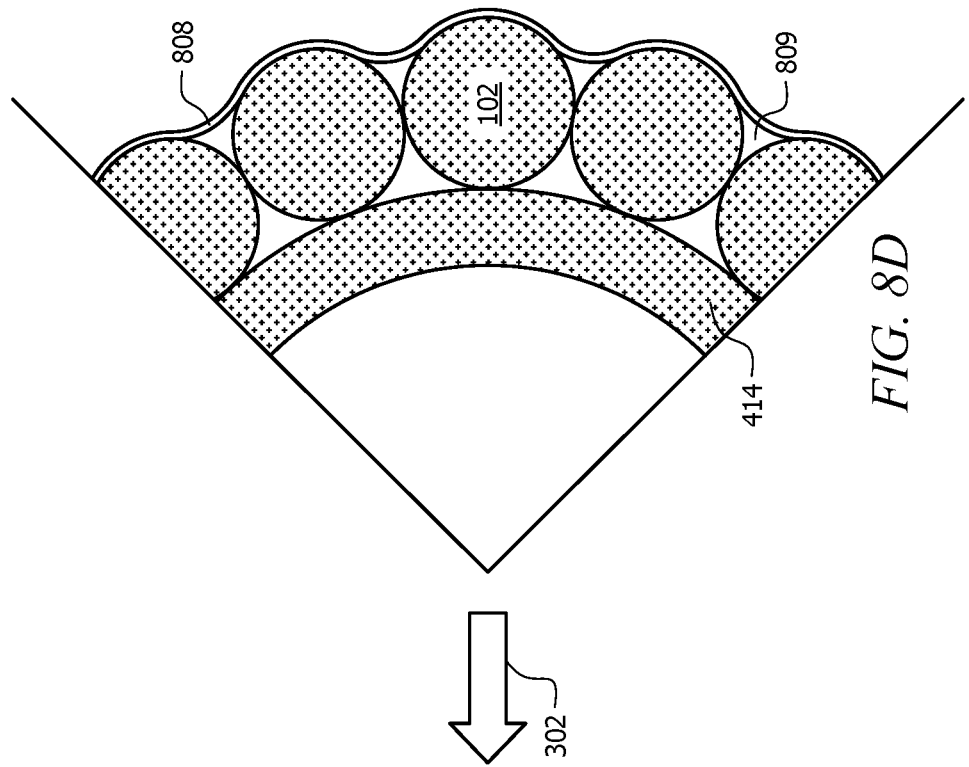
FIGS. 8C and 8D illustrate flexing of a filter media, in accordance with an embodiment of the disclosure.
Figure 8C:
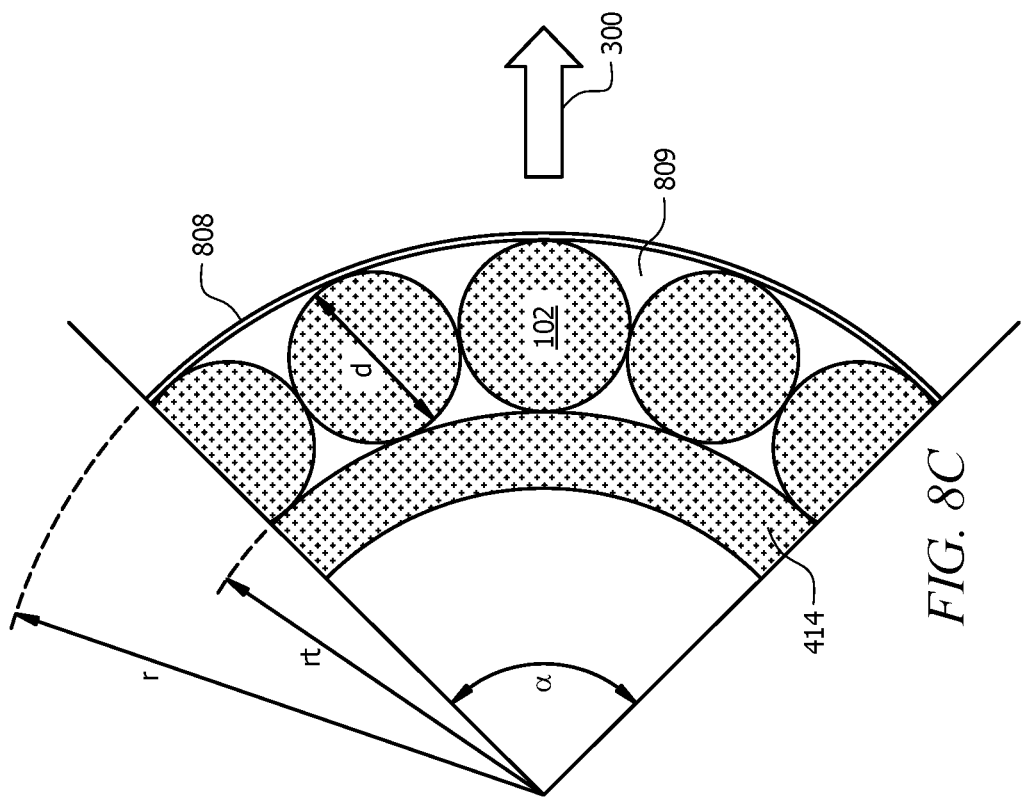

FIG. 8C illustrates a top view of filter media 808 during an out-flow period (filter self-cleaning period) after an in-flow period shown on FIG. 8D. As shown, as a gas (purging/cleansing gas) exits filter media 808, filter media 808 moves/flexes outward from space 809 due to flow/pressure of the gas exiting and may rebound or move back substantially to a pre-filtering/initial physical form. The flow of exiting gas is depicted by arrow 302. The self-cleaning period allows for the gas to exit the filter media 808, thereby flexing in an outward direction the filter media 808. This flexing can result in a removal of at least a portion of any filter cake that has adhered to filter media 808.

FIG. 8D illustrates a top view of a filter media 808 during the flow-in period (filtering period). As shown, as a fluid enters filter media 808, filter media 808 moves/flexes inward into space 809 due to flow/pressure of the fluid being filtered and may conform to an outside surface of tubes 102, as shown. The flow of entering fluid is depicted by arrow 300.

Figure 9:
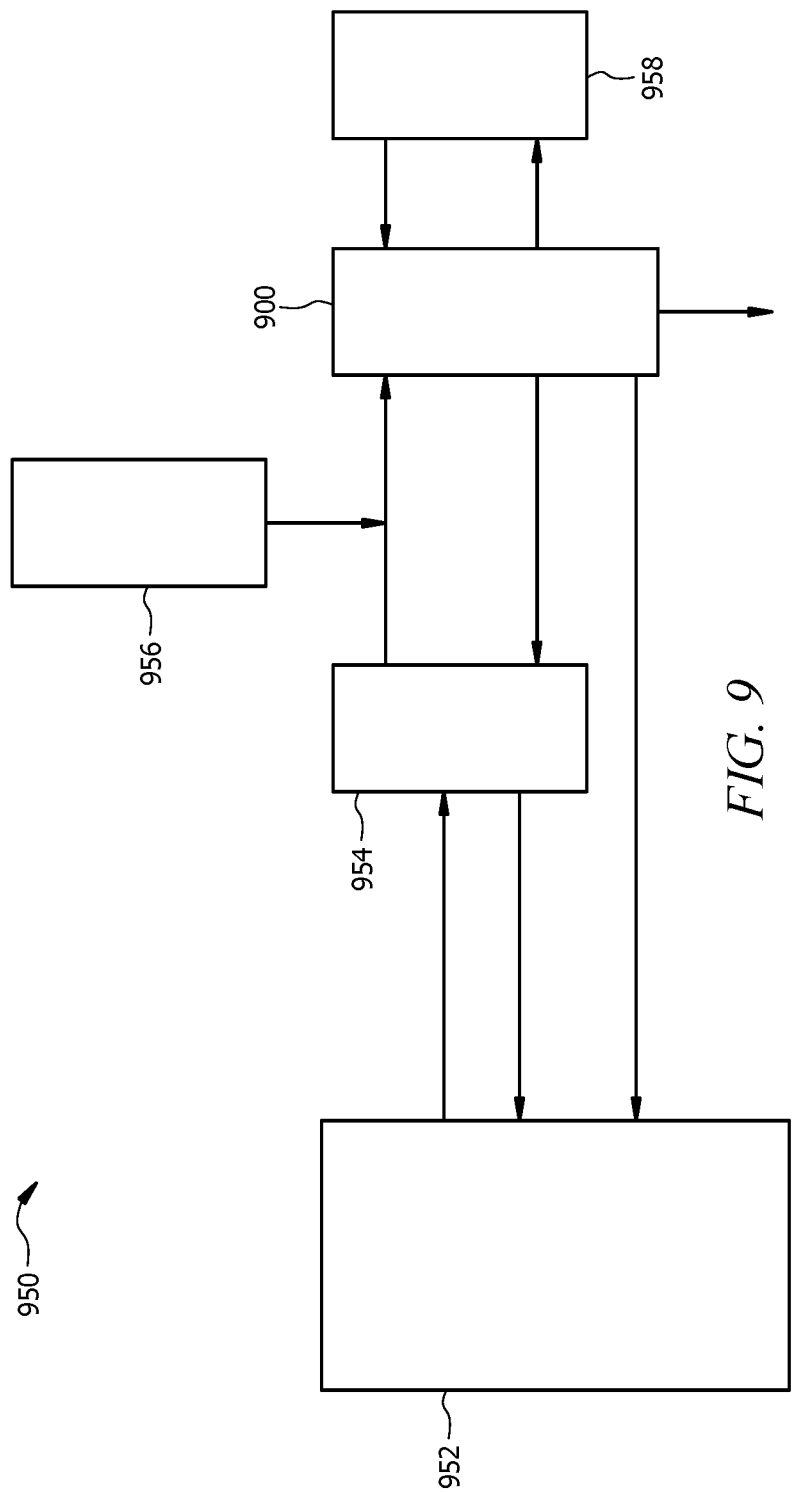
FIG. 9 is a schematic illustration of a filtering system according to an embodiment.

FIG. 9 illustrates a schematic flow diagram of a filter system 950 according to some embodiments. As illustrated, a process 952 using a fluid can provide a rich fluid containing particles or elements to be filtered out of the fluid to an optional feed tank 954, and then to a filtering vessel 900. The process 952 can comprise any type of process that uses a liquid and results in particles or components within the fluid that can be filtered. Exemplary processes can include fluid units for oil and gas, power generation, water and waste water, battery production, food processing and refining, metals plating and galvanizing, chemical processing, and other industrial processes. The filtering vessel 900 can include any of the self-cleaning filter elements as described herein, and suitable arrangements and components of the filtering vessel 900 are described in more detail herein.

When present, the feed tank 954 can serve as an intermediate holding tank prior to the rich fluid being passed to the filtering vessel 900. The feed tank 954 can serve as a surge tank and/or as a chemicals tank such that one or more chemicals can be dosed into the rich fluid and allowed to react prior to the rich fluid passing to the filtering vessel 900. In some aspects, a filtrate such as a powdered material used to form a filter cake on the filter element for use in the filtering process can be introduced into the feed tank 954 after the filter cleaning process, as described in more detail herein. In some embodiments, the feed tank can be used to contain a chemical or solution to clean the filter element within the filtering vessel 900. For example, the feed tank 954 can contain water, a cleaning solution (e.g., soap, de-scaling agents, etc.), or the like to remove any remaining contaminants from the filter element, piping, sensors, and valves as part of the self cleaning process.

In order to prevent settling of the components in the feed tank 954, a mixing device or agitator can be installed within the feed tank 954 in some embodiments to keep the rich fluid in the tank well mixed. When additional chemicals are added into the fluid in the feed tank 954, the mixer or agitator can be used to provide a mixed solution to ensure a full reaction between the chemicals and the components in the rich fluid prior to the rich fluid passing to the filtering vessel 900. Examples of reactants and conditions are provided herein.

A gas source 956 can be fluidly coupled to the filtering vessel 900 to provide the gas used to remove the filtered solids from the filter element. For example, the gas source 956 can provide the gas for the back-pulse. While illustrated as a vessel, the gas source 956 can include any combination of a compressed gas source (e.g., a pressure tank, etc.), a compressor, a fan, a blower, or the like. Further, the gas can comprise any suitable gas for the process 952. In some aspects, the gas can comprise air. In other aspects, the gas may comprise an inert gas such as nitrogen, argon, or the like when reactive gases such as flammable gases are present within the filtering vessel 900. While shown as supplying air to a fluid line between the process 952 and/or the feed tank 954, the gas source 956 can also be in direct fluid communication with the filtering vessel 900.

In some embodiments, an optional buffer tank 958 can be in fluid communication with the filtering vessel 900 and/or one or more additional components such as the feed tank 954 or disposed between the process 952 and the feed tank 954. The buffer tank 958 can serve to store some amount of the process fluid and allow for some amount of pressure buffering within the system. For example, the buffer tank 958 can contain a gas and/or contain the process fluid in a bladder or other expandable container. The buffer tank can then serve to reduce pressure forces or shocks within the system during the filtering and cleaning process. For example, when fluid flow stops (e.g., creating a water hammer effect, etc.) and/or the gas is introduced into the system, the buffer tank 958 can serve to reduce the peak pressure loads to protect the various components of the system. In some embodiments, the buffer tank 958 can help to provide a pressure buffer when the components of the system are vertically separated. For example, when the filtering vessel 900 is disposed below the process 952, the buffer tank 958 can serve to buffer the pressure between the two processes and aid in the startup process after a self-cleaning cycle. In some embodiments, the buffer tank 958 may not be present, and the feed tank 954 may serve to provide a buffering function within the system.

During a normal filtering operation, the rich process fluid can be passed from the process 952 to the filtering vessel 900, which can comprise one or more vessels with filter assemblies arranged in parallel or series. When a feed tank 954 is present, the rich process fluid can pass to the feed tank 954 before passing to the filtering vessel 900. The rich process fluid can then be filtered within the filtering vessel 900 to capture the filtered particles from the fluid, and the filtered, clean process fluid can pass back to the process 952. This process can continue so long as the filtering vessel 900 has filtering capacity. Various measurements and sensors can be used within the filtering vessel 900 to determine the filtering capacity, including sensors such as pressure sensors, position sensors, fluid level detectors, and the like. For example, the filtering capacity can be determined by a pressure drop across the filter element within the filtering vessel 900, though other sensors and sensed process conditions can also be used to determine the filtering capacity of the filter element.

When the filter element needs to be cleaned, a self-cleaning cycle can be initiated. During the self-cleaning cycle, the process fluid passing to the filtering vessel 900 may be stopped. As described in more detail here, the process fluids within the filtering assembly 900 can first be drained from the filtering vessel 900. The process fluid can be recovered and passed back to the process to avoid loss of the process fluids. In some embodiments, the process fluid can be passed into the feed tank 954 to store the fluid from the filtering vessel during the cleaning cycle.

Once the fluids are removed from the filtering vessel 900, a drying gas can be introduced into the filtering vessel to dry the filtered solids on the filter element. Once dried, a back-pressure pulse or flow of gas can be supplied from the gas source 956 to break the dried filter materials loose from the filter assembly and cause the dried materials to fall to a bottom of the filtering vessel 900. A valve or flap in the lower portion of the filtering vessel 900 can then be actuated to allow the dried solids to pass out of the filtering vessel 900.

In some embodiments, the filter element can use a filtrate material used to form a filter cake on the filter element. The filtrate material can comprise any suitable material that can form a filter cake that is then used to filter the particulates or components from the process fluid. The filtrate is generally a particulate material (e.g., a powder) that is capable of being filtered on filter element to form the filter cake while being relatively porous to allow for flow of the process fluid through the resulting filter cake. Examples of filtrate can include diatomaceous earth, perlite and/or other mineral based filter media powders, and the like.

The filtrate can be removed with the filtered materials and be can be replaced prior to starting the filtering process. In order to introduce the filtrate, the process fluid can initially be circulated between the feed tank 954 and the filtering vessel 900 prior to introducing process fluids from the process 952. The filtrate can be introduced into the fluid in the feed tank 954, and an agitator or mixer can be used to form a mixture of the filtrate and the process fluids. The mixture can then be passed through the filtering assembly 900 where the filtrate can form a filter cake on the filter element in the filtering assembly 900. The clean or filtered process fluid can be returned to the feed tank 954 until the filtrate is filtered on the filter element to form the filter cake. The process fluid can then be introduced into the filter assembly 900 directly or through the feed tank 954 to continue the normal filtering process. The filtering and self-cleaning cycles can be continued and repeated in order to maintain a desired level of filtering of the process fluids.

Within the self-cleaning process, the filter element can be cleaned as described herein, and the process fluid can be re-introduced into the filtering vessel after the self-cleaning. In some aspects, the filter element and the associated piping, valves, and/or sensors may be cleaned to remove any residual contaminants such as scale, residual filter particles, residual filtrate, and the like. For example, the filter element can build up scale over time that may not be removed in the self-cleaning process, and the scale can contribute to an initial backpressure across the filter element that can limit the useful filtering time of the filter element. In order to remove any build up on the filter element and associated equipment, a chemical solution such as hot water, cleaning solution, scale remover, etc. can be circulated through the filtering vessel after the self-cleaning process and before the process fluid is reintroduced into the filtering vessel. In some embodiments, the cleaning fluid can be included in the feed tank and used to circulate between the feed tank and the filtering vessel to clean the filter element and the filtering vessel and associated equipment. Once circulated and cleaned, the filtering vessel can be returned to use to filter the process fluids. The filter element cleaning may occur periodically or as needed based on contaminant buildup on the filter element and associated equipment, for example, as measured by a backpressure reading or pressure drop in the filtering vessel.

Figure 10A:
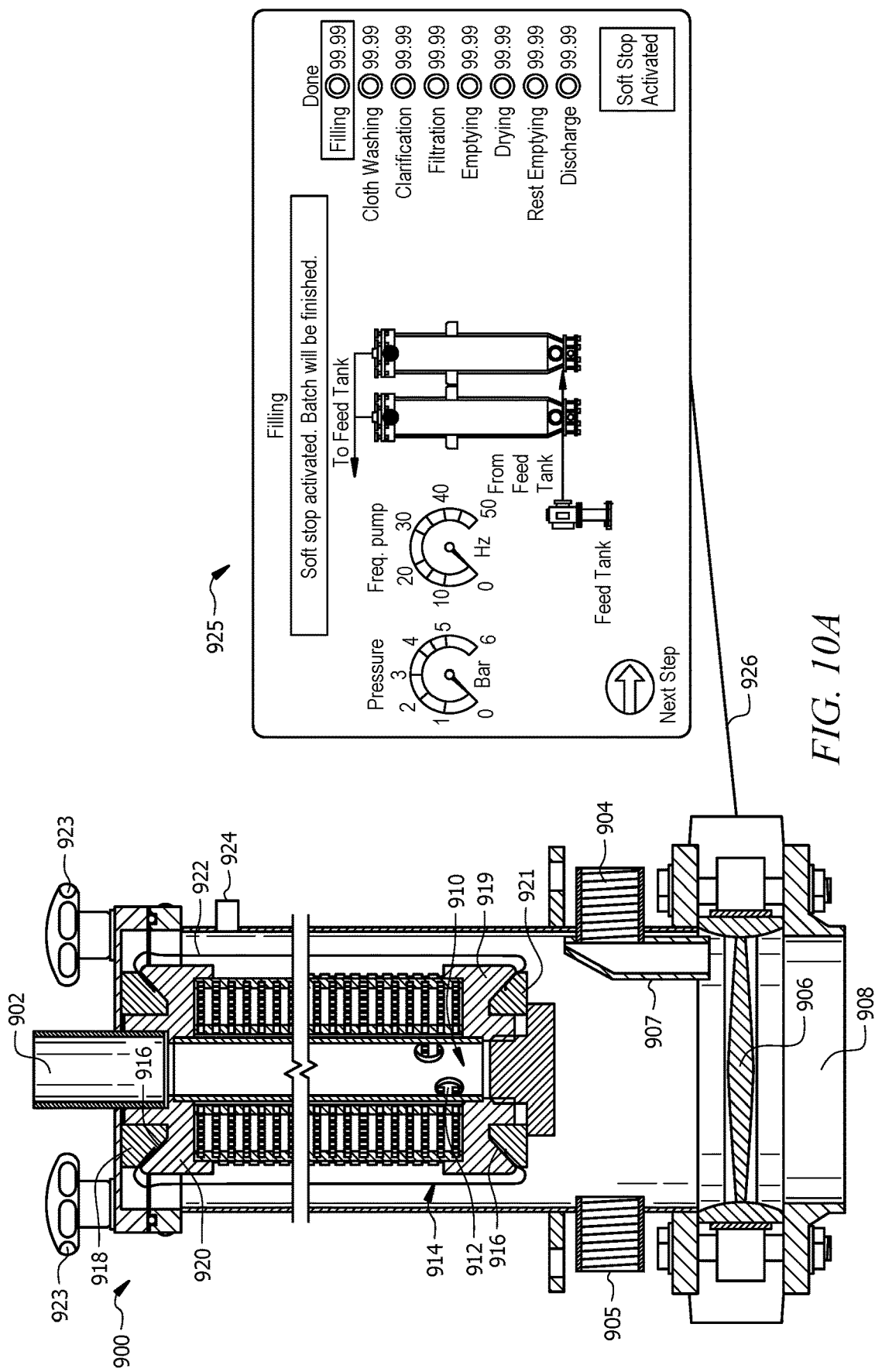
FIGS. 10A-10F illustrate an operation of a self-cleaning filter with a filtrate tube, in accordance with an embodiment of the disclosure.

Having described the general components and operation of the system, embodiments of the operation of the filtering vessel 900 will now be described. FIG. 10A illustrates an embodiment of the filtering vessel 900. The vessel 900 is configured to contain a self-cleaning filter element as described above, and any of the embodiments of the filter element as described herein can be used in the vessel 900. The vessel 900 may be a container configured to withstand high pressures and high temperatures during filtering operations. The vessel 900 may be a sealed/pressurized vessel. Depending on the operating conditions, the vessel 900 can be constructed of a suitable material capable of withstanding the temperatures, pressures, and chemicals encountered in a filtering process. In some embodiments, the vessel 900 may be formed from metals or alloys (e.g., steel, stainless steel, etc.), a composite material, polymers (e.g. polypropylene, polyvinylidene fluoride (PVDF), etc.), polymer coated or lined metal (e.g., a rubber lined vessel), or the like and can be configured to withstand high pressures and high temperatures during filtering operations.

In some embodiments, the vessel 900 may include a filtered fluid outlet 902 ("outlet 902"), which can be or can be fluidly coupled to, a valve at a first end (top) of the vessel 900, a feed inlet 904, which can be or can be fluidly coupled to, a valve at a second end (bottom), and a filter cake disposal valve 906. A filter cake discharge chute 908 may be adjacent to the disposal valve 906. The vessel 900 may include a filter 914 that may be a particular implementation of a filter as discussed above (e.g., filter 200, 500, 600, or 800). The vessel 900 may also include filtered fluid flow tube 910 ("flow tube 910") to receive filtered liquid via one or more inlets 912. The flow tube 910 may be a particular implementation of any of the embodiments of a core or a volume reducer as described herein. It should be noted that the flow tube 910 may include inlets 912 (e.g., side inlets in FIG. 10A) or inlet 223 (e.g., bottom inlet in FIG. 2D) or 418 (e.g., bottom inlet in FIG. 4B).

In some embodiments a drain tube 907 can be present within the filtering vessel 900. The drain tube 907 can be coupled to the feed inlet 904 and provide a sealed fluid pathway between the feed inlet 904 and a lower portion of the filtering vessel 900 above the disposal valve 906. The drain tube 907 allows the fluid within the filtering vessel 900 to be nearly completely drained from the filtering vessel 900 during a drying a filter cleaning process, as described in more detail herein. A second feed inlet 905 can be optionally present in the vessel 900 for use as a feed inlet or a drain outlet. The second inlet 905 may be useful for high flow operations where additional flow rate into and/or out of the vessel 900 is needed.

The filter can be retained within the vessel 900 using various retaining components. In some embodiments, the vessel 900 may include pinch points 916 between a first retaining ring 918 and first filter holder 920, and between a second retaining ring 921 and a second filter holder 919. The first retaining ring 918 can engage the first filter holder 920 with the filter media 922 disposed therebetween to retain the filter media 922 in position at a top of the filter. The second retaining ring 921 and the second filter holder 919 can be engaged with the filter media 922 disposed therebetween to retain the filter media 922 in position at the bottom of the filter. This engagement can retain the filter media 922 in position during use.

A cap can be retained on the vessel 900 using clamps or retaining bolts 923 that can be threaded into corresponding holes on a body of the vessel 900. A seal can be disposed between the cap and the body to form a seal for the vessel 900. The engagement of the cap with the body can compress the retaining rings 918, 921, and the filter holders 919, 920. In some embodiments, the first retaining ring 918 can threadedly engage the first filter holder 920, and the second retaining ring 921 can threadedly engage the second filter holder 919 to form a filter assembly. The filter media 922 may be a particular implementation of a filter media, as described above. The vessel 900 may also include a gas inlet valve 924 that may be utilized for directing gas into vessel 900 for drying filter cake on the filter media 922. The gas inlet valve 924 may also be utilized as a vent for pressurized fluid within the vessel 900. A system controller 925 (e.g., a computer system) may include a processor, memory, and display and can be configured to operate the vessel 900 (e.g., opening or closing valves, detecting temperatures and pressures with sensors positioned in vessel 900). System controller 925 may be in signal communication with the vessel 900 (e.g., via a wired or wireless connection such as signal line 926).

During operation of the filter 914, a liquid comprising one or more contaminants can be fed to vessel 900 via feed inlet 904, or optionally, inlet 905. The disposal valve 906 and the gas inlet 924 may remain closed. The vessel 900 may fill up with the liquid to be filtered. During this process and once the vessel 900 is full of the liquid to be filtered, the liquid can flow through the filter media 922 and through the filter 914 and into the flow tube 910. At least a portion of the contaminants in the fluid can be filtered by the filter media 922 and begin to form a filter cake on an exterior surface of the filter media 922, allowing the filtered fluid to pass into the filter. The flow tube 910 may be fluidly coupled to the outlet 902. After entering the flow tube 910, the clean, filtered fluid may exit filter 900 via outlet 902, which can be or can be in fluid communication with, a valve.

Figure 10B:
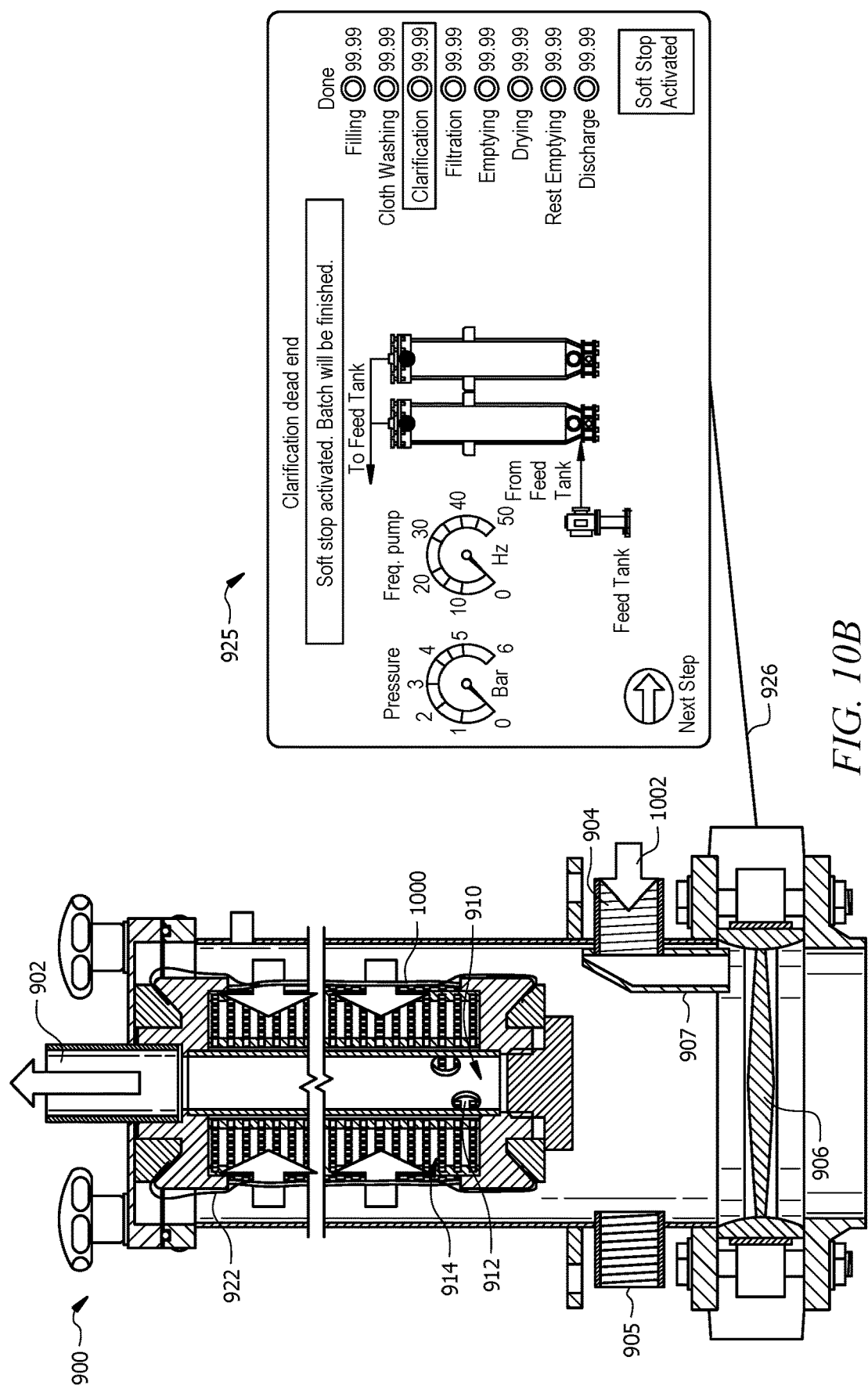

FIG. 10B illustrates filter cake 1000 accumulating on the filter media 922. The direction of a flow of liquid is depicted by arrows 1002. The liquid containing the one or more contaminants can enter vessel 900 via the inlet 904, enter the filter 914 (e.g., after passing through the filter media 922 and perforations). After passing through filter 914, the filtered liquid can flow into the flow tube 910 via the inlets 912. The flow tube 910 receives the filtered liquid. The filtered liquid can flow out of the vessel 900 via outlet 902. The flow rate through the vessel 900 can be controlled using one or more control valves and/or through a control of the pumping rate (e.g., the pump speed, etc.). A thickness of filter cake 1000 may correspond with a pressure differential between fluid pressure at inlet 904 and outlet 902, where a thicker filter cake 1000 can be associated with a higher pressure differential. Once the differential pressure is detected to be above a threshold and/or after a threshold time period, the system controller 925 can cease the filtration process.

Figure 10C:
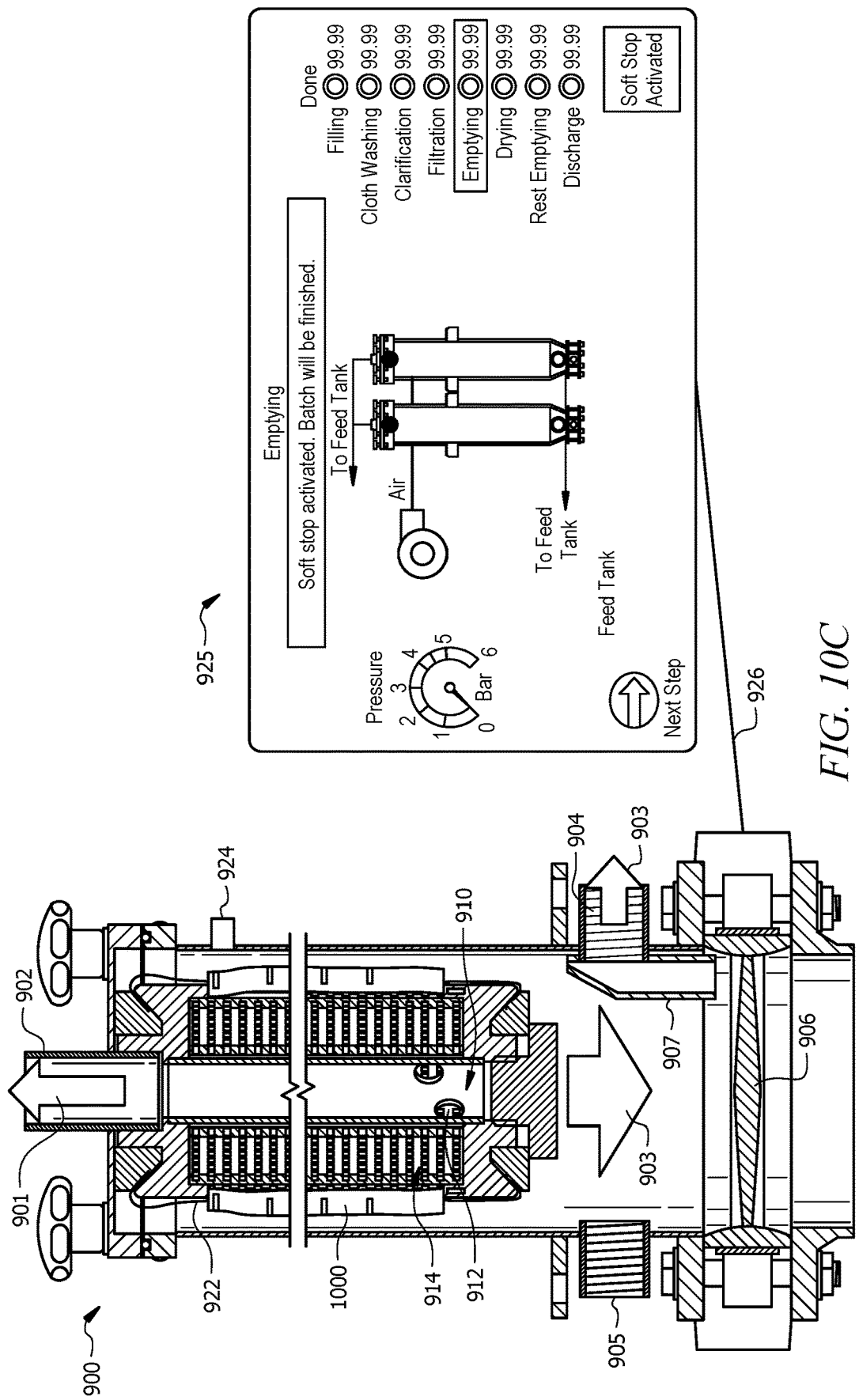

Once the filtration process is stopped, the self-cleaning cycle can be initiated. As a first step, the vessel 900 can be emptied of the liquid being filtered. FIG. 10C illustrates emptying of liquid from the vessel 900 after filtration is complete. The remaining clean liquid within the flow tube 910 can be directed to the outlet 902 (see arrow 901), and any unfiltered liquid remaining outside of the filter media 922 can be directed back into a feed tank through the feed inlet 904 (see arrows 903). It can be noted that a minor amount of filtered fluid retained in the filter media and/or flow tube 910 may pass back out of the filter media 922 and pass through the feed inlet 904 when the vessel 900 is being drained. A purge gas can be introduced into the vessel 900 via inlet 924 to assist with clearing any remaining fluid within vessel 900. As the gas flows into the vessel 900, any filtered liquid within the flow tube 910 can flows out through outlet 902. Any unfiltered liquid outside of the filter media 922 within the vessel 900 can flow back into a feed tank through the inlet 904. The use of the drain tube 907 can allow the fluid to be removed from slightly above the valve 906. The fluid can be pumped out from the vessel 900 out of the inlet 904 and/or pulled by a suction or vacuum out of the inlet 904. The suction or vacuum can be generated using any suitable process or device. In some embodiments, the suction or vacuum can be generated through the use of an eductor in fluid communication with the outlet to create suction at the outlet (e.g., at the drain tube 907). The use of suction along with the drain tube 907 can allow for the vessel 900 to be substantially emptied of liquids before the drying cycle begins. Once empty, the inlet 904 can be closed, for example, using a valve.

Figure 10D:
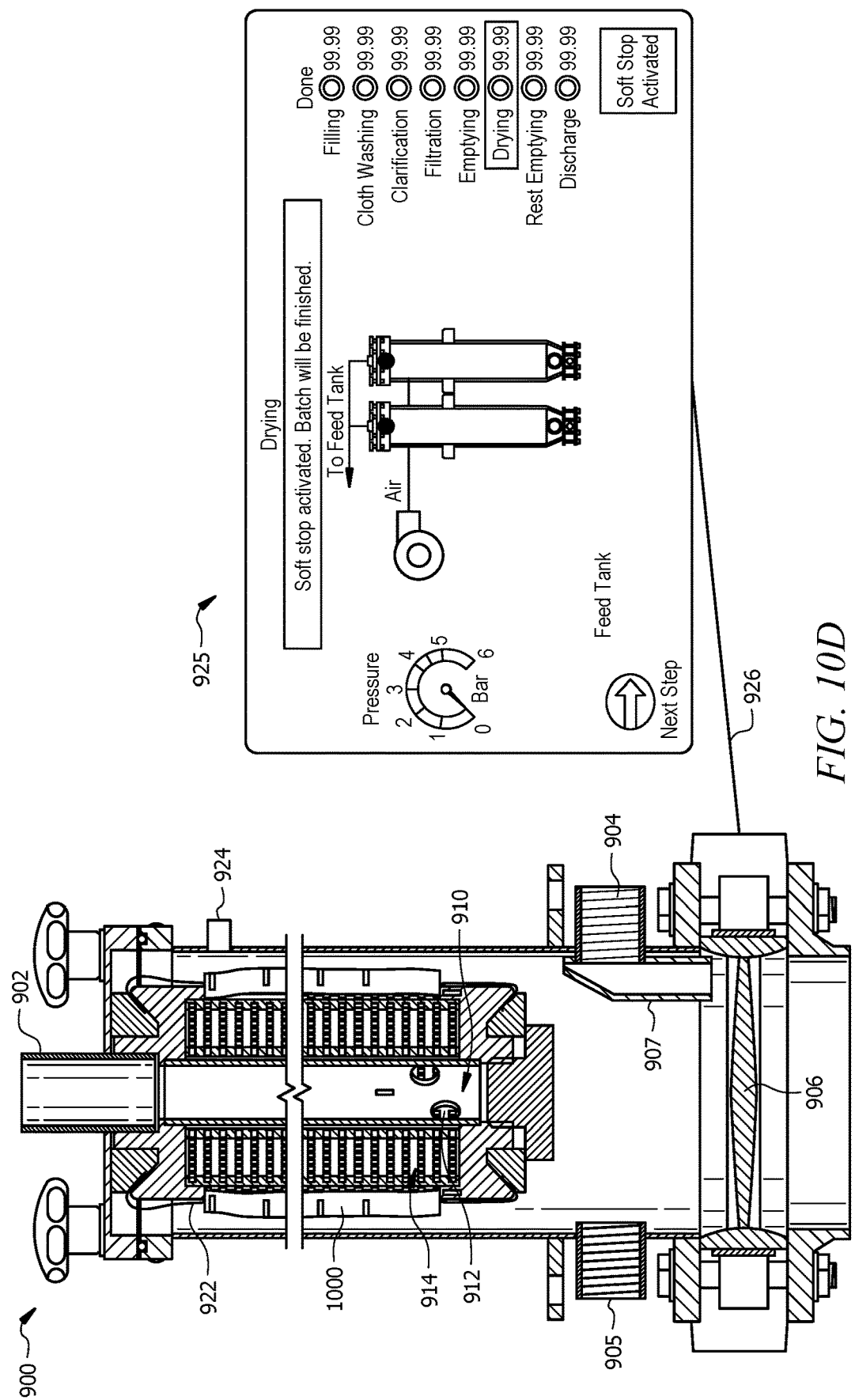

Once the vessel 900 is drained, the filter media 922 can have the wet filter cake disposed thereon within the vessel 900. In order to limit the amount of material to be cleaned from the filter media 922, the filter cake can be dried within the vessel 900 before being removed. In order to dry the filter cake 1000, a drying gas can be passed into the vessel 900. FIG. 10D illustrates the filter cake 1000 drying with a drying gas that is pumped into vessel 900 via inlet 924. The gas is utilized to dry filter cake 1000 from filter media 922. The gas may enter flow tube 910 via inlets 912 and may exit vessel 900 via outlet 902. Vessel 900 remains pressurized during drying.

The gas used during the drying cycle can be any suitable gas. In some embodiments, air can be used as the drying gas if oxygen is not reactive with the chemicals in the filter cake.

Otherwise, an inert gas such as nitrogen can be used. In order to dry the filter cake, the gas can be heated and/or dried prior to passing into the vessel 900. For example, the gas can be heated to between 5° C. and 95° C. prior to passing into the vessel 900. The temperature of the gas will depend on the materials used to form the filter and housing and/or the type of chemicals being filtered within the vessel 900. The use of a heated and/or dried gas may improve the drying times for the filter cake.

Figure 10E:
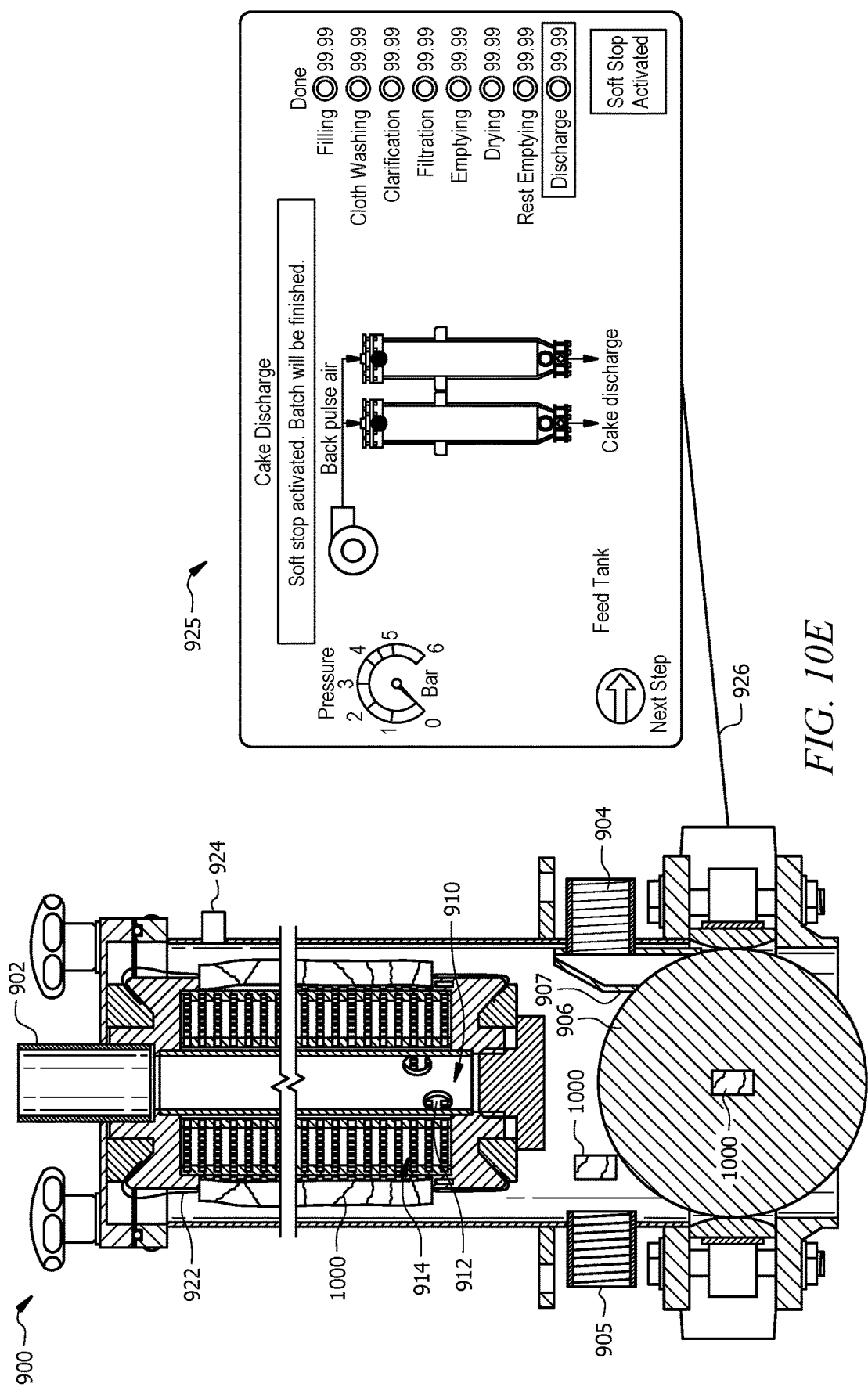

Once dried, the filter cake 1000 can be removed from the filter media 922. FIG. 10E illustrates the filter cake 1000 being removed from the filter media 922. In order to remove the dried filter cake from the filter media 922, the flow of the drying gas can be stopped. Any remaining gas pressure can be released via outlet 902. Depending on the gas composition, a purge gas can be optionally used to purge the vessel 900 if needed. The valve 906 can be opened in order to collect the dried filter cake when removed from the filter media 922. When removed, the pieces of the filter cake 1000 can fall from the filter media 922 and pass through the valve 906 (open position) for collection and subsequent disposal.

Figure 10F:
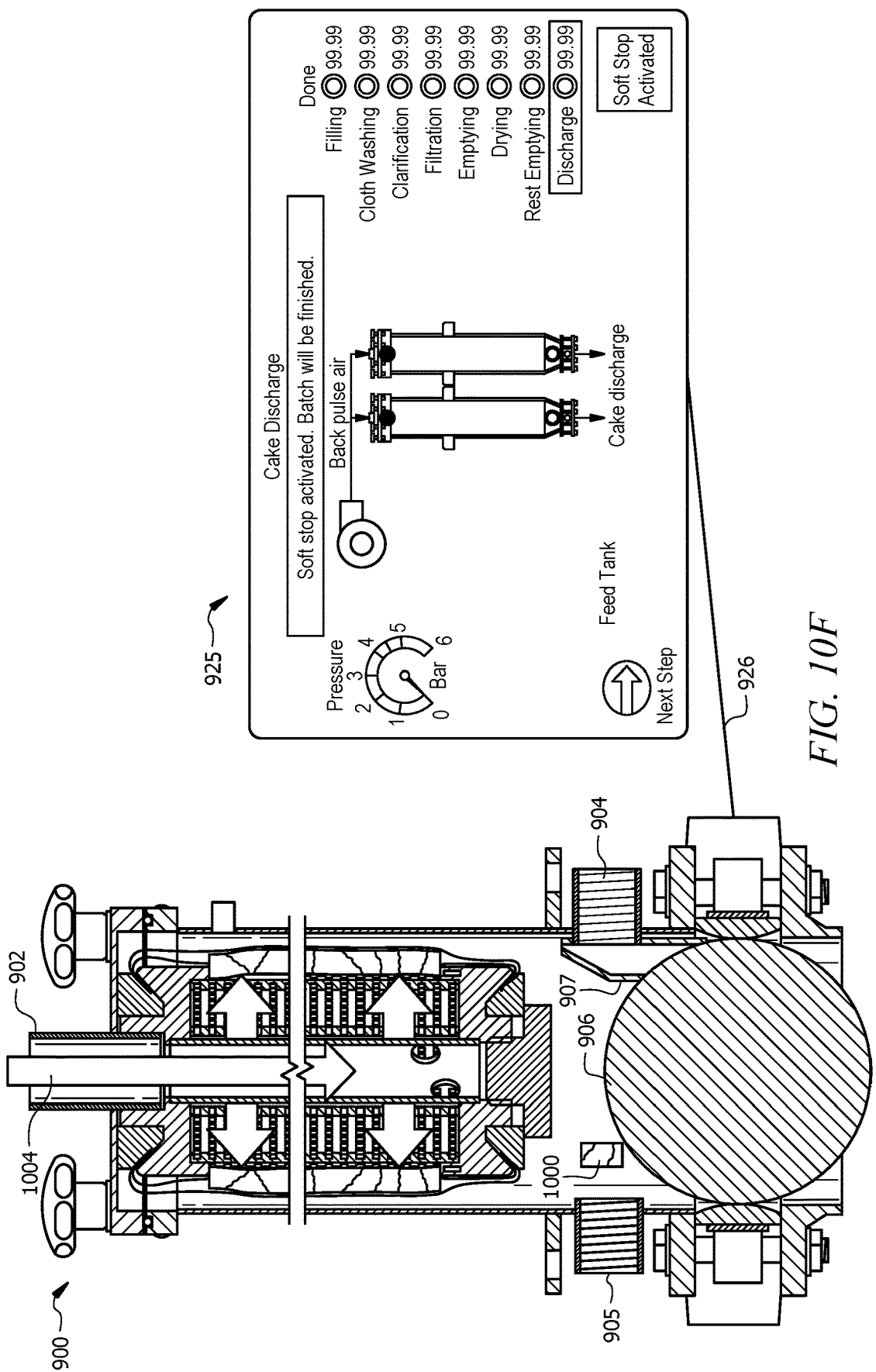

In order to remove the dried filter cake from the filter media 922, a back-pulse of a gas can be used to expand the filter media 922. The back-pulse can be provided by a gas source such as a compressed gas source (e.g., a pressure tank, etc.), a compressor, a fan, a blower, or the like. FIG. 10F illustrates a flow of gas entering the vessel 900 via the outlet 902 depicted by arrows 1004. This back pulse flow of gas causes the filter media 922 to be restored to the original shape as discussed herein. For example, the filter media 922 may conform to the shape of the tube(s) and/or spacers as described above during the filtration process. The filter cake can also conform to the shape of the filter media 922 during the filtration process. By back-pulsing the filter media 922, the filter media 922 can expand outward and change shape. The change in shape may cause the dried filter cake to break into pieces and become dislodged from the filter media 922.

The amount of the gas used for the back-pulse can depend on the need to provide a pressure differential within the interior of the filter media 922. As the volume within the filter assembly increases, a large amount of gas is needed in order to provide a given amount of pressure differential, which would need to be supplied by a larger gas reservoir (e.g., a pressure tank, etc.), fan, compressor, or the like. This can lead to a correspondingly larger compressor and associated equipment. In order to reduce the amount of gas needed for the back-pulse, a core or volume reducer as described herein can be used. The core or volume reducer can reduce the total amount of space or volume that needs to be pressurized with the gas in order to back-pulse the filter media 922. This can then reduce the size of the equipment needed to provide the back-pulse.

Once dislodged, the dried filter cake pieces can then pass downwards through the valve 906 into a receptacle. After this back pulse flow of gas, the filtration and cleaning process is complete, and the valve 906 can be closed. Vessel 900 may be ready for a subsequent filtration cycle for another batch of contaminated liquid. Thus, the self-cleaning cycle can be used to reduce the total amount of waste generated from the system by drying the filter cake within the vessel so that only a dried filter cake is removed from the system. Further, the filter cake can be removed without the need for the removal of the entire self-cleaning filter assembly and without requiring users to handle the wet, and potentially harmful, filter cake materials.

Within the system illustrated in FIG. 10A-10F, a filtering system can comprise a plurality of vessels 900 arranged in parallel. This allows the system to continue to filter the liquids through at least one vessel 900 while one or more additional vessels are placed into the self-cleaning process. In some embodiments, a filtering system can comprise 2-10 vessels, with at least 2 vessels fluidly connected in parallel.

Figure 11A:
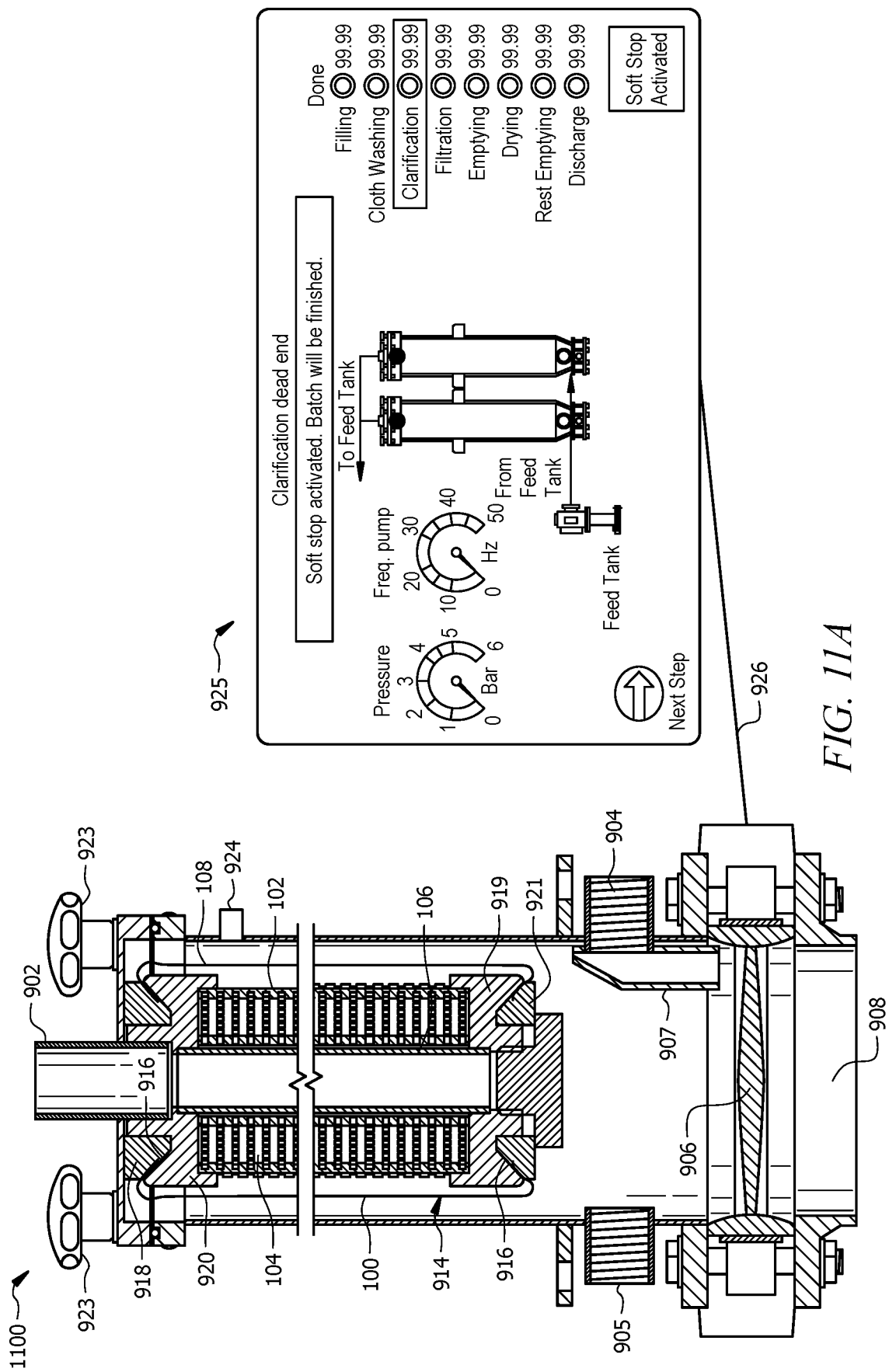
FIGS. 11A-11F illustrate an operation of a self-cleaning filter without a filtrate tube, in accordance with an embodiment of the disclosure.

Another embodiment of a filtering system is shown in FIGS. 11A-11F. FIG. 11A illustrates a filtering vessel 1100, which can be similar to the vessel 900. The vessel 1100 may be formed from metals or alloys (e.g., steel, stainless steel, etc.), a composite material, polymers (e.g. polypropylene, polyvinylidene fluoride (PVDF), etc.), polymer coated or lined metal (e.g., a rubber lined vessel), or the like and can be configured to withstand high pressures and high temperatures during filtering operations. The vessel 1100 may be a sealed vessel except for the filtered fluid outlet 902 at a first end (top) of the vessel 1100, a feed inlet 904 at a second end (bottom), and a filter cake disposal valve 906. A filter cake discharge chute 908 may be adjacent (below) to the valve 906. The vessel 1100 may include a self-cleaning filter including any of those described herein. The vessel 1100 may include a chamber 106 for receiving filtered fluid. In some embodiments, the filter may not include a flow tube to collect fluids from a lower portion of the filter to pass the fluids out of the filtered fluid outlet 902.

The vessel 1100 may include the filter media coupled in the same manner as described with respect to the vessel 900. The vessel 1100 may also include gas inlet 924, which can be coupled to a valve, that may be utilized for directing gas into the vessel 1100 for drying the filter cake on the filter media 108. The gas inlet 924 may also be utilized as a vent for pressurized fluid within the vessel 1100 in portions of the filtering and/or self-cleaning cycles. A system controller 925 (e.g., a computer system as described in more detail herein) may include a display and can be configured to operate the vessel 1100 (e.g., opening or closing valves, detecting temperatures and pressures with sensors positioned in the vessel 1100).

During operation of the filter system, a liquid comprising one or more contaminants can be fed to the vessel 1100 via the feed inlet 904. The disposal valve 906 and the gas inlet 924, and optional inlet 905, may remain closed during the filtration process. In some embodiments, the gas inlet 924 can optionally be used to vent any gas in the vessel 1100 while the vessel 1100 is initially filling. The vessel 1100 may fill up completely with the liquid to be filtered, including a portion of the liquid that passes through the filter media to fill the filter.

After the vessel 1100 is full of liquid to be filtered, the liquid can be circulated through the vessel 1100 such that the liquid flows through filter and into the chamber 106. The chamber 106 may be fluidly coupled to the outlet 902. After entering the chamber 106, clean fluid may exit the vessel 1100 via the outlet 902. The flow of fluid can be controlled by an outlet valve, a pumping speed (e.g., thereby controlling the pump speed), or a combination thereof.

Figure 11B:
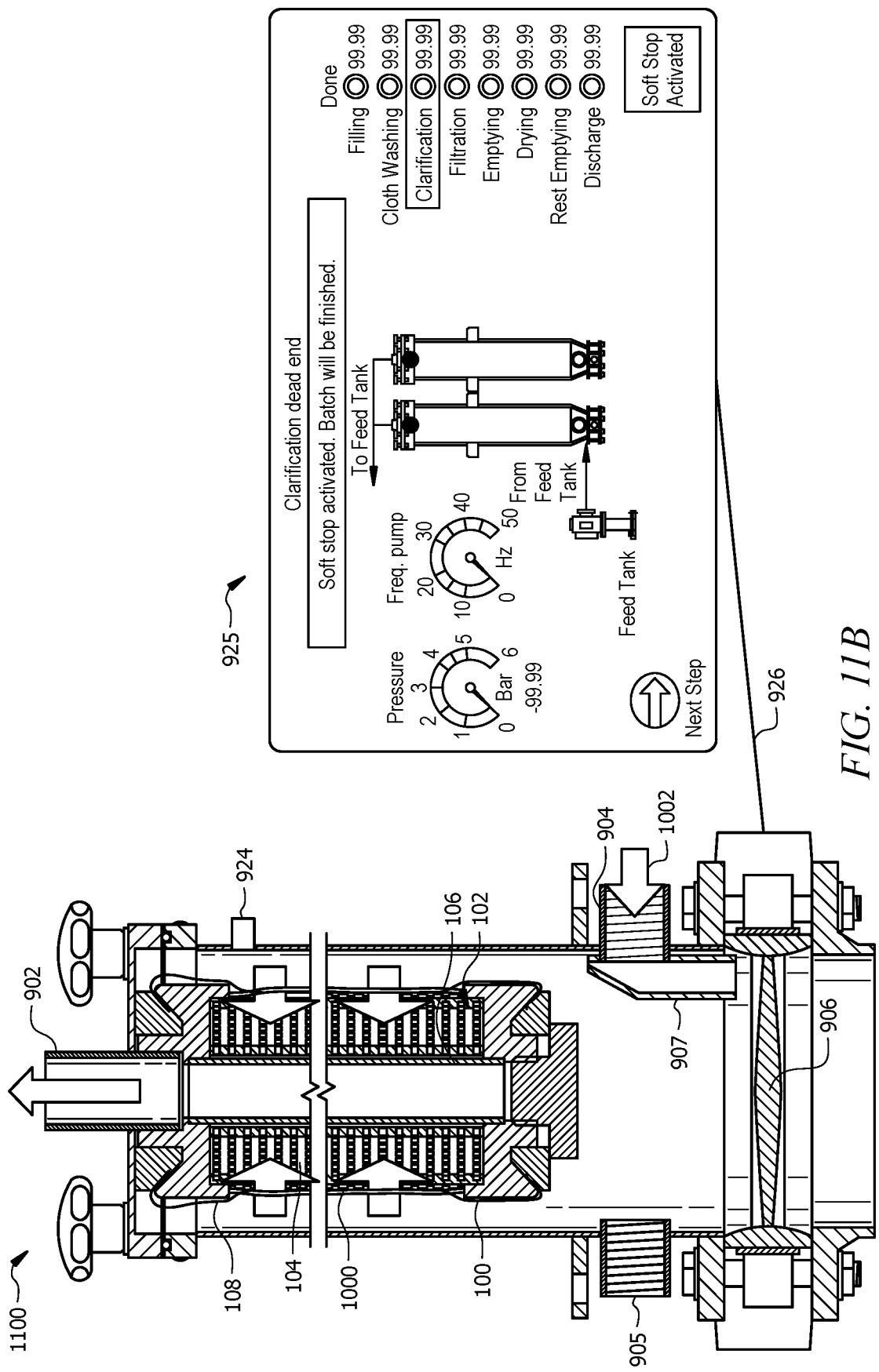

During the filtration process, a filter cake 1000 can form on an outer surface of the filtration medium. FIG. 11B illustrates the filter cake 1000 accumulating on the filter media 108. The direction of a flow of the liquid is depicted by the arrows 1002. The contaminated liquid enters the vessel 1100 via the inlet 904 and/or optional inlet 905, enters the filter (passing through filter media 108 and perforations 104). After passing into the filter, the liquid is clean (e.g. having at least a portion of the contaminants removed by being filtered) and can flow into the chamber 106 via perforations 104 and filter media 108. The chamber 106 receives the filtered liquid. The filtered liquid can flow out of the vessel via the outlet 902. A thickness of filter cake 1000 may correspond with a pressure differential between fluid pressure at inlet 904 and outlet 902. The thicker the filter cake 1000 is, the larger the pressure differential may be across the filter cake and filtration media. Once a threshold differential pressure is detected and/or after a threshold time period occurs, for example as detected by a system controller 925, the filtration process can be halted.

Figure 11C:
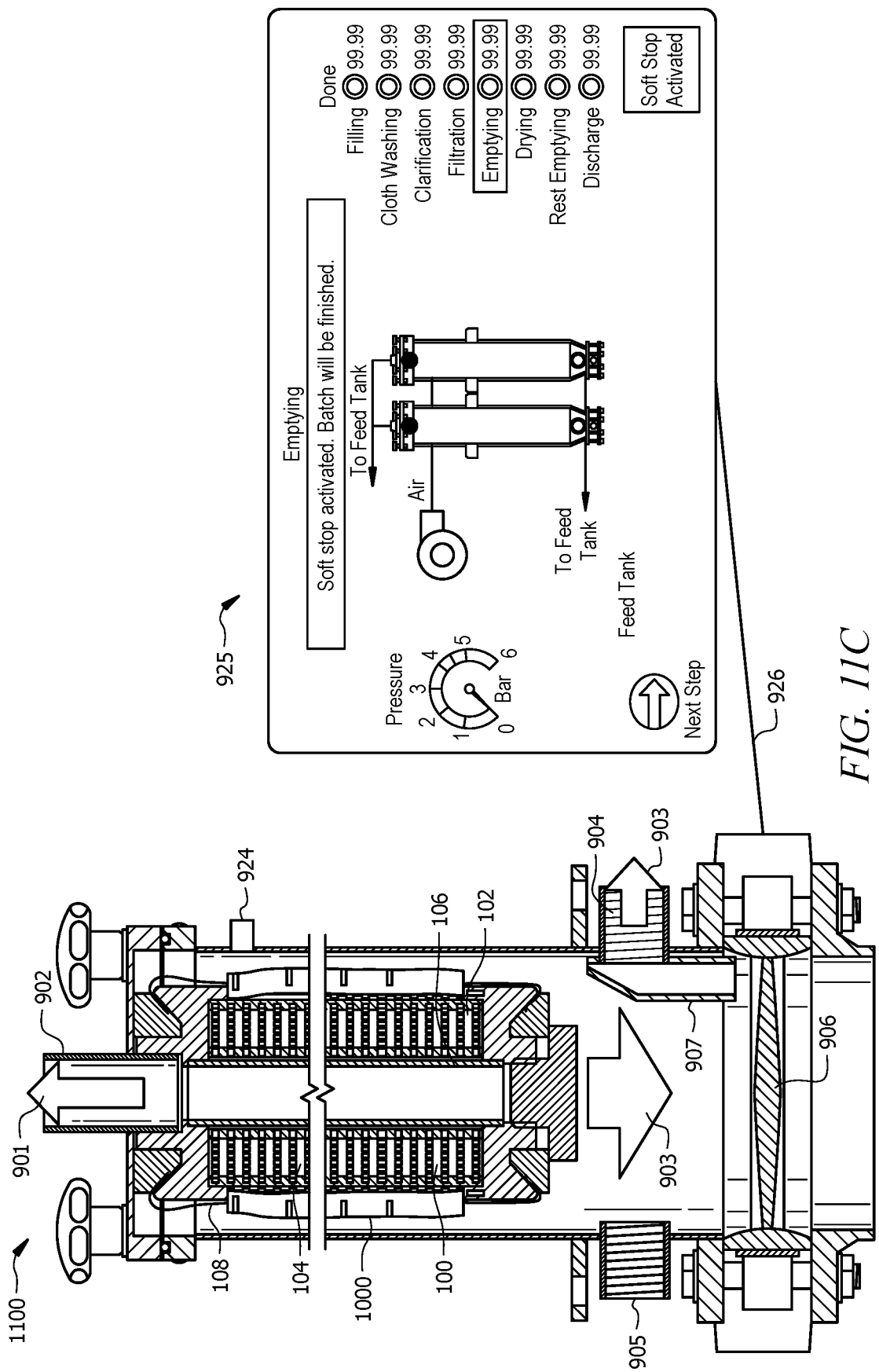

Once the filtration process is halted, the self-cleaning cycle can be initiated. The self-cleaning cycle can begin by draining the liquid from the vessel 1100. FIG. 11C illustrates the emptying of the liquid from the vessel 1100 after filtration is complete. The liquid remaining in the vessel 1100 can be directed back into a feed tank through the feed inlet 904 (see arrow 903). A purging gas may flow into the vessel 1100 via the inlet 924 to assist with clearing any remaining fluid within the vessel 1100. As the gas flows into the vessel 1100, the remaining liquid can flow back into a feed tank through inlet 904. A drain tube 907 can be used to allow the fluid to be drained down to the top of the valve 906 using pressure within the vessel 1100 and or suction from the inlet 904. Once empty, an inlet valve coupled to the inlet 904 can be closed.

Figure 11D:
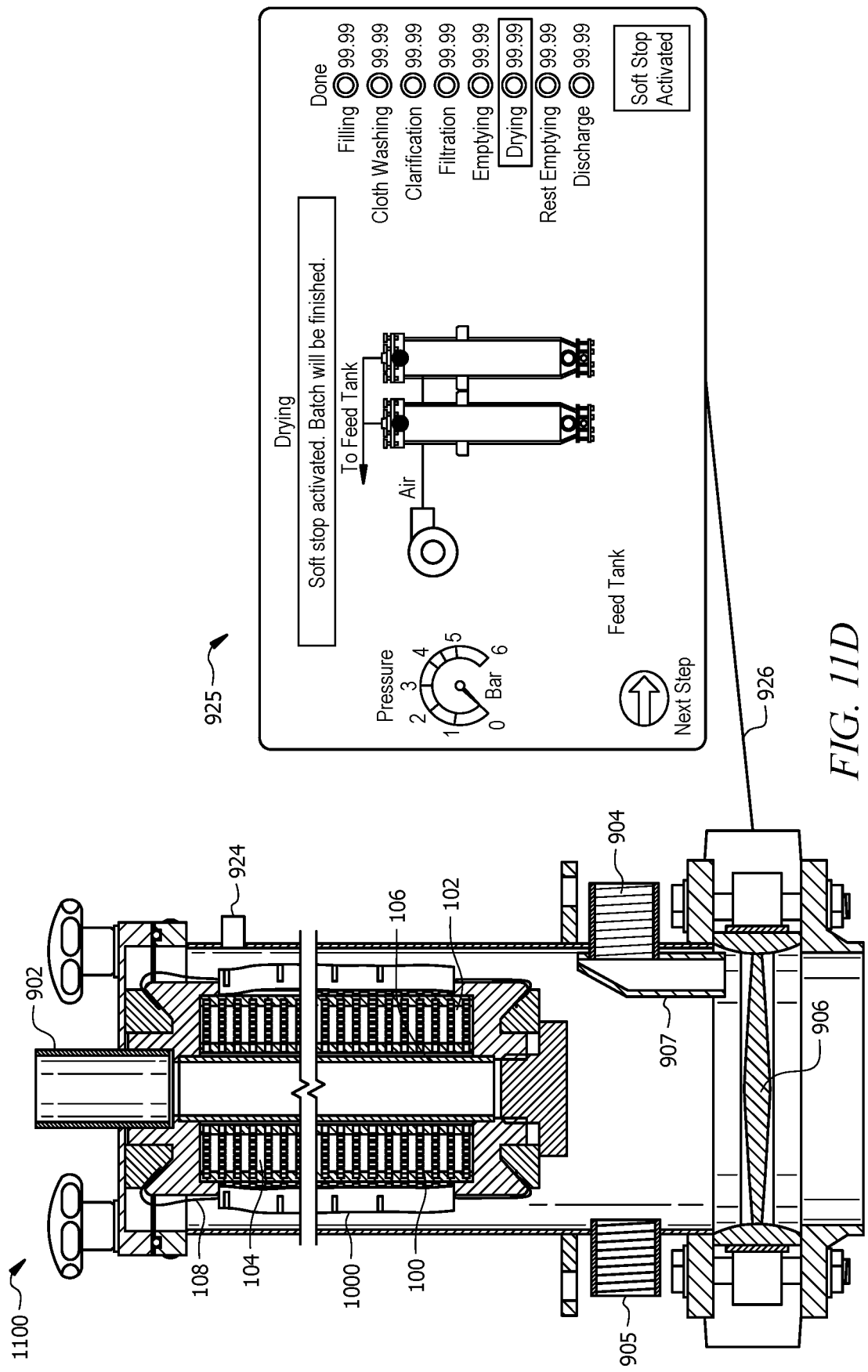
Figure 11E:
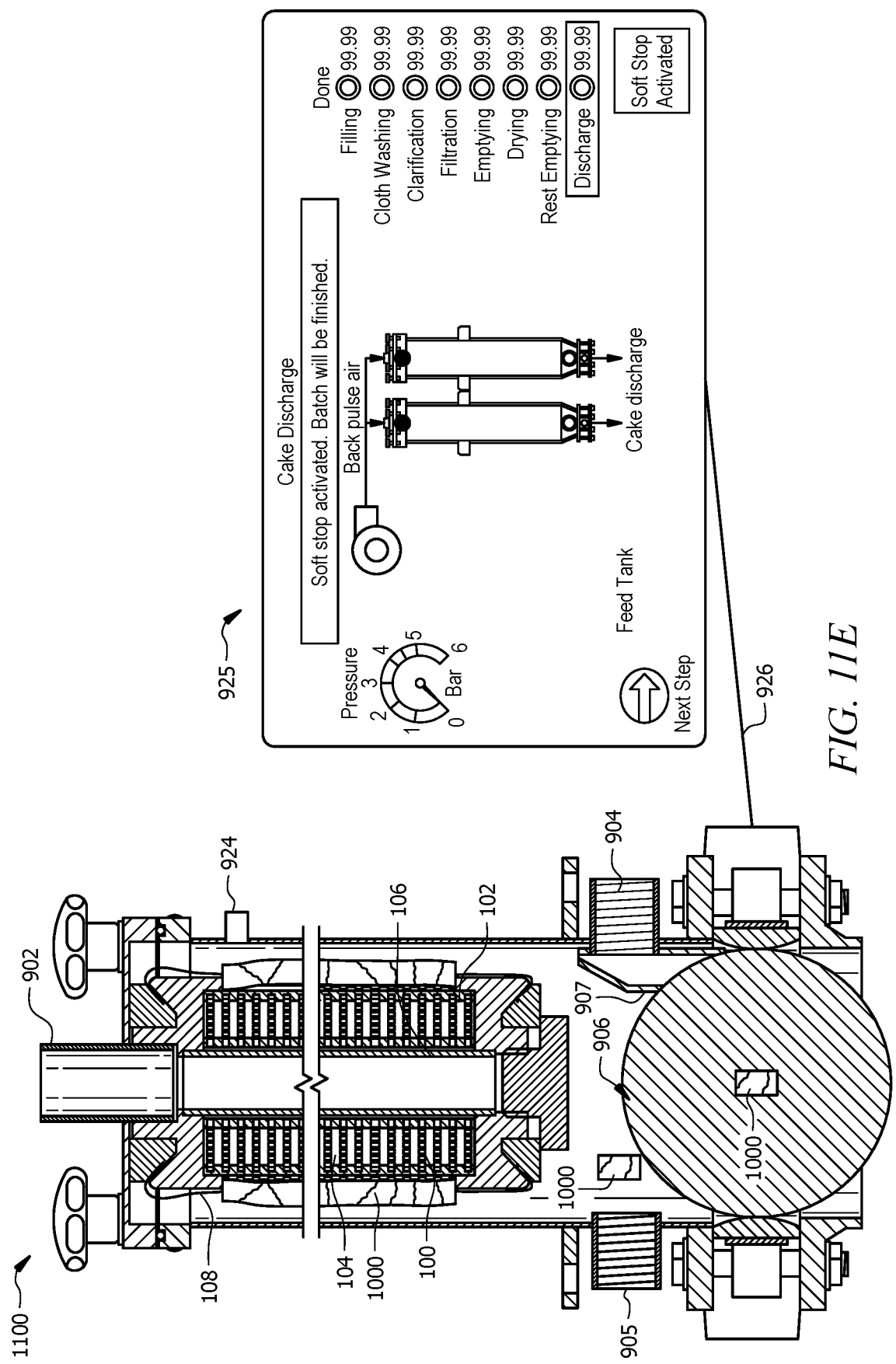

The vessel can then contain the filter cake 1000 on the filter media. FIG. 11D illustrates the filter cake 1000 being dried with a drying gas that is passed into the vessel 1100 via the inlet 924. The drying gas is utilized to dry the filter cake 1000 on the filter media 108. The drying gas may enter the chamber 106 via the perforations 104 and may exit the filter 1100 via the outlet 902. FIG. 11E illustrates the dried filter cake 1000 on the filter media 108. As shown, the filter cake can start to crack based on shrinkage as the filter cake dries.

Figure 11F:
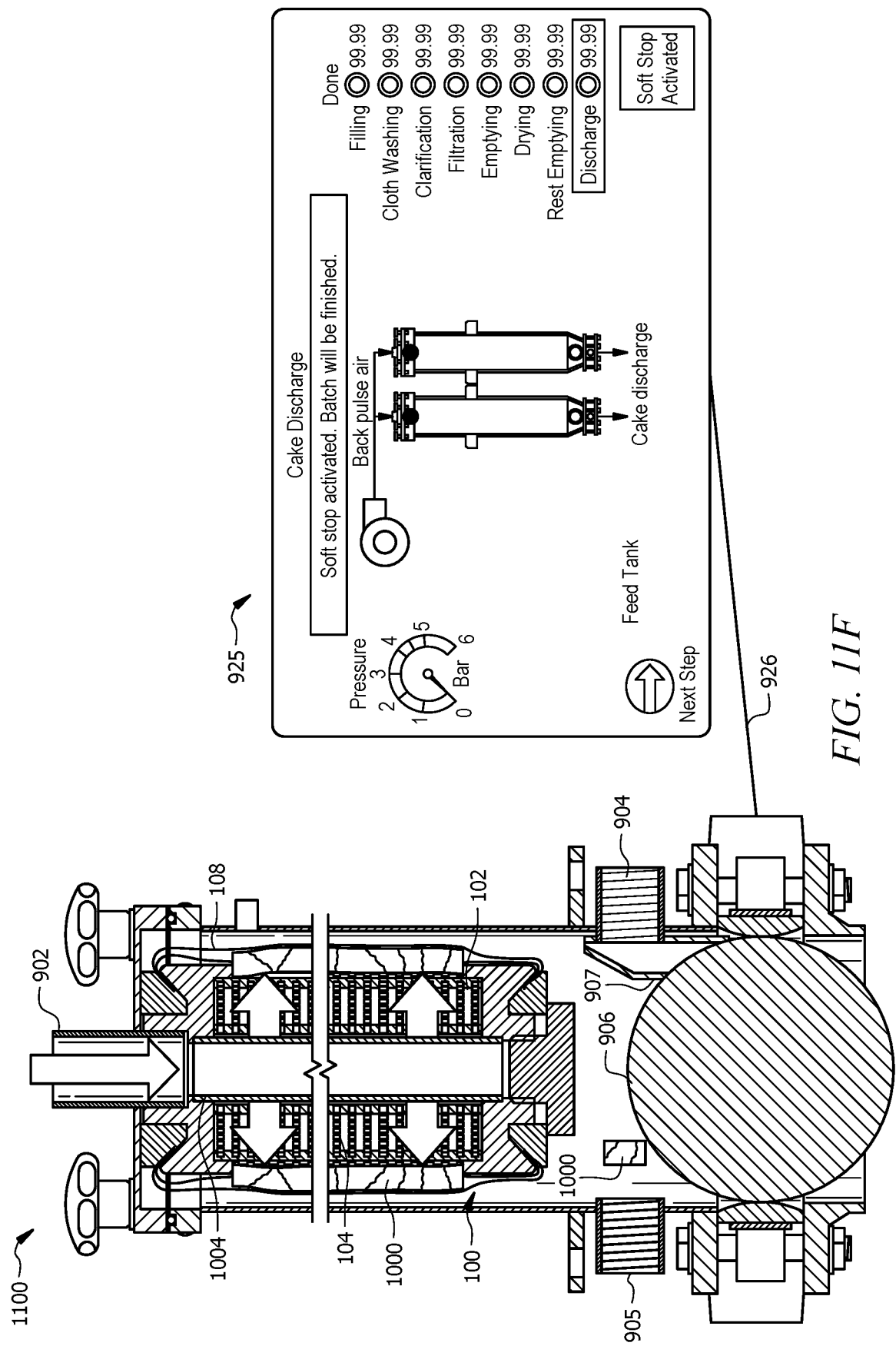

Once dried, the filter cake can be removed from the filter media via one or more back-pulses of gas. FIG. 11F illustrates a flow of gas entering the vessel 1100 via the outlet 902 depicted by the arrows 1004. This back pulse flow of gas can cause the filter media to expand and dislodge the filter cake 1000 from the filter media 108 after the drying of filter cake 1000. The dried filter cake can then break off and pass through the valve 906 for collection and disposal. After this back pulse flow of gas, the filtration and cleaning process is complete. Vessel 1100 may be ready for a subsequent filtration cycle for another batch of contaminated liquid.

The filter system and the filtering vessel(s) as described herein can be used for any type of process used to filter solids from liquids. As an example of a process that can use the filtering vessel in addition to chemical additions, a galvanizing process can be carried out and the filtering system can be used to precipitate iron and filter the precipitated iron from the flux solution. Galvanizing refers to the process of coating iron or steal with a protective layer of zinc. Prior to the zinc coating process, the iron or steel to be coated can be cleaned using various solutions to remove surface oxidation in order to provide for a suitable bond between the zinc and the iron or steel.

While a number of surface cleaning processes can be used, in some embodiments a flux solution can be used to clean the surface oxidation from the iron or steel. Various flux compositions can be used such as a zinc-ammonium chloride solution. When contacted with steel or iron, the flux solution can remove the oxidation layer, and some amount of iron can be solvated into the solution in the form of $Fe^{2+}$ and some particles can also be formed in the solution. In order to filter the flux solution, the flux solution can be passed through the filter system including any of the systems described herein.

In order to prevent a buildup of iron in the system, an oxidizer and pH control agent can be added into the flux solution prior to the flux solution passing into the filtering vessel. The oxidizer can convert the $Fe^{2+}$ to $Fe^{3+}$ and create insoluble precipitates in the solution. The pH control agent can serve to correct the pH of the flux solution as part of the oxidation reaction. Suitable oxidizers can include hydrogen peroxide, though other oxidizers such as chlorine dioxide, ozone, or potassium permanganate can also be used in some aspects. Suitable pH control agents can include any suitable acid or base that is compatible with the other components of the flux solution.

The flux cleaning process can be described with respect to the system of FIG. 9. In an embodiment, the process 952 can be a flux cleaning process that can use a flux solution that can pass to a feed tank 954. The flux process 952 can comprise contacting a metal with a flux solution. Within the process 952, the flux solution can entrain particles and dissolved iron to create the rich flux solution.

The rich flux solution can pass to a feed tank 954. Within the feed tank 954, one or more oxidizers and pH control agents can be dosed into the feed tank 954 to mix with the rich flux solution. An oxidation reaction can occur to convert the iron into a non-soluble species that can precipitate from the rich flux solution. A mixer can be used within the feed tank 954 to keep the precipitated iron dispersed in the solution and prevent settling and building of the iron within the feed tank.

The rich flux solution carrying the precipitated iron species can then pass to the filtering vessel 900. The filtering vessel 900 can comprise any of the filtering vessels and configurations described herein. Within the filtering vessel 900, the rich flux solution can pass through a filter element that can remove any particles in the rich flux solution, including the precipitated iron species. The flux solution with the solids filtered out can then pass through the filter element and out of the filtering vessel 900 as a clean flux solution before passing back to the flux process 952. This process can continue until the filter element triggers a threshold such as a pressure drop across the filter element to indicate that the filter element needs cleaning.

When the filter element within the filtering vessel 900 needs to be cleaned, a self-cleaning cycle can be initiated. During the self-cleaning cycle, the flux solution passing to the filtering vessel 900 may be stopped. As described in more detail here, the process fluids within the filtering assembly 900 can first be drained from the filtering vessel 900. In some embodiments, the feed tank can be drained with the fluids passing back to the process 952, and the feed tank 954 can be used to store the fluids within the filtering vessel 900 during the cleaning cycle.

Once the fluids are removed from the filtering vessel 900, a drying gas can be introduced into the filtering vessel to dry the filtered solids on the filter element, including any particles within the flux solution and the precipitated iron species. Once dried, a back-pressure pulse or flow of gas can be supplied from the gas source 956 to break the dried filter materials loose from the filter element and cause the dried materials to fall to a bottom of the filtering vessel 900. A valve or flap in the lower portion of the filtering vessel 900 can then be actuated to allow the dried solids to pass out of the filtering vessel 900, as described in more detail herein.

In some embodiments, the filter element can use a filtrate material used to form a filter cake on the filter element. The filtrate can be useful in filtering finer particles such as precipitated iron species. The filtrate material can comprise any suitable material that can form a filter cake that is then used to filter the particulates or components from the process fluid. The filtrate used with the flux cleaning process can include any of those described herein.

Once the filter cake has been removed and the filter element has been cleaned, the cleaning process can be resumed by introducing the fluid starting with the fluid in the feed tank. The filtering of the stored flux solution in the feed tank 954 can help to ensure that no unfiltered flux solution is passed back to the flux process 952. When a filtrate is used, the filtrate can be introduced into the feed tank with the flux solution. The mixer can ensure that the filtrate is mixed in the flux solution. The flux solution with the filtrate can then be circulated between the feed tank 954 and the filtering vessel 900 to form the filter cake on the filter element. Once the filtrate is filtered out of the flux solution, the flux solution can then be introduced into the filter assembly 900 directly or through the feed tank 954 to continue the normal filtering process. The filtering and self-cleaning cycles can be continued and repeated in order to maintain a desired level of filtering of the process fluids, and the oxidizers and pH control agents can be introduced into the system upstream of the filtering assembly 900 in order to control the amount of dissolved iron in the flux solution.

Having described various systems and methods herein, some embodiments can include, but are not limited to:

In a first embodiment, a filter comprises: a tube comprising perforations, the tube configured to receive a flow of a liquid from a first direction or a flow of a gas from a second direction opposite to the first direction; a filter media positioned concentrically around the tube; and one or more spacers positioned between the tube and the filter media to create a space between the tube and the filter media; wherein a portion of the filter media is configured to flex inward into the space during the flow of the liquid into the filter, and flex outward from the space during the flow of the gas exiting the filter.

A second embodiment can include the filter of the first embodiment, further comprising: a reinforcement core positioned within the tube, wherein the reinforcement core at least partially extends along a length of the tube and includes portions to support the tube and prevent deformation of the tube.

A third embodiment can include the filter of the second embodiment, wherein the reinforcement core includes recesses configured to receive filtered fluid.

A fourth embodiment can include the filter of any one of the first to third embodiments, further comprising: a volume reducer positioned within the tube, wherein the volume reducer includes an internal chamber and extends at least partially along a length of the tube, wherein the internal chamber is configured to not receive filtered fluid.

A fifth embodiment can include the filter of the fourth embodiment, wherein a passage extends through the volume reducer, wherein the passage is configured to receive filtered fluid.

In a sixth embodiment, a filter comprises: a plurality of tubes, each tube comprising perforations and each tube configured to receive a flow of a liquid from a first direction or a flow of a gas from a second direction opposite to the first direction; and a filter media positioned concentrically around the plurality of tubes to form a space between adjacent tubes of the plurality of tubes and a portion of the filter media; wherein the portion of the filter media is configured to flex inward into the space during the flow of the liquid into the filter, and flex outward from the space during the flow of the gas exiting the filter.

A seventh embodiment can include the filter of the sixth embodiment, wherein one or more tubes of the plurality of tubes comprises a reinforcement core positioned within the tube, wherein the reinforcement core at least partially extends along a length of the tube and comprises portions configured to support the tube and prevent deformation of the tube.

An eighth embodiment can include the filter of the seventh embodiment, wherein the reinforcement core comprises recesses to receive filtered fluid.

A ninth embodiment can include the filter of any one of the sixth to eighth embodiments, further comprising: a volume reducer positioned between the plurality of tubes, wherein the volume reducer includes an internal chamber and extends along a length of the tubes, wherein the internal chamber is configured to not receive filtered fluid.

A tenth embodiment can include the filter of the ninth embodiment, wherein a passage extends through the volume reducer, wherein the passage is configured to receive filtered fluid.

An eleventh embodiment can include the filter of any one of the sixth to tenth embodiments, further comprising a passage extending at least partially along lengths of the tubes, wherein the passage is positioned between the tubes, wherein the passage is configured to receive filtered fluid.

In a twelfth embodiment, a method of filtering a fluid comprises: receiving a liquid in a vessel including a filter; receiving the liquid in the filter from a first direction, wherein the filter comprises: a tube including perforations; a filter media positioned concentrically around the tube; and one or more spacers positioned between the tube and the filter media, wherein a space is created between the tube and the filter media when the liquid is received from the first direction; flexing a portion of the filter media inward into the space upon receipt of the liquid; accumulating a filter cake on the filter media in response to receiving the liquid in the filter from the first direction; receiving a gas in the filter from a second direction opposite to the first direction; flexing the portion of the filter media outwards from the space upon receipt of the gas; and removing the filter cake from the filter media based on flexing the portion of the filter media outwards.

A thirteenth embodiment can include the method of the twelfth embodiment, further comprising: drying the filter cake with the gas.

A fourteenth embodiment can include the method of the thirteenth embodiment, wherein the filter further comprises: a reinforcement core positioned within the tube, wherein the reinforcement core at least partially extends along a length of the tube and includes portions to support the tube and prevent deformation of the tube.

A fifteenth embodiment can include the method of the fourteenth embodiment, wherein the reinforcement core includes recesses to receive filtered fluid.

A sixteenth embodiment can include the method of any one of the thirteenth to fifteenth embodiments, wherein the filter further comprises: a volume reducer positioned within the tube, wherein the volume reducer includes an internal chamber and extends at least partially along a length of the tube, wherein the internal chamber does not receive filtered fluid.

In a seventeenth embodiment, a method comprises: receiving a liquid in a vessel including a filter; receiving the liquid in the filter from a first direction, wherein the filter comprises: a plurality of tubes, each tube comprising perforations; and a filter media positioned concentrically around the tubes to form a space between two tubes and a portion of the filter media; flexing the portion of the filter media inward into the space upon receipt of the liquid; accumulating a filter cake with the filter media; receiving a gas in the filter from a second direction opposite to the first direction; flexing the portion of the filter media outwards from the space upon receipt of the gas; and removing at least a portion of the filter cake from the filter media in response to flexing the portion of the filter media outwards.

An eighteenth embodiment can include the method of the seventeenth embodiment, further comprising: drying the filter cake with the gas.

A nineteenth embodiment can include the method of the eighteenth embodiment, wherein the filter further comprises: a reinforcement core positioned within each tube, wherein the reinforcement core at least partially extends along a length of each tube and includes portions to support each tube and prevent deformation of each tube.

A twentieth embodiment can include the method of any one of the seventeenth to nineteenth embodiments, wherein the filter further comprises: a volume reducer positioned within each tube, wherein the volume reducer includes an internal chamber and extends at least partially along a length of each tube, wherein the internal chamber does not receive filtered fluid.

A twenty first embodiment can include the method of any one of the seventeenth to twentieth embodiments, further comprising: a volume reducer positioned between the plurality of tubes, wherein the volume reducer includes an internal chamber and extends along a length of the tubes, wherein the internal chamber is configured to not receive filtered fluid.

A twenty second embodiment can include the method of the twenty first embodiment, wherein a passage extends through the volume reducer, wherein the passage is configured to receive filtered fluid.

In a twenty third embodiment, a method of filtering a fluid comprises receiving a flux solution in a feed tank; introducing an oxidizer into the flux solution in the feed tank; forming a precipitate in the flux solution within the feed tank in response to introducing the oxidizer; passing the flux solution with the precipitate to a filtering vessel containing a filter comprising a filter media; receiving the flux solution with the precipitate in the filter from a first direction; flexing a portion of the filter media inward into the space based on receipt of the flux solution with the precipitate; accumulating a filter cake on the filter media in response to receiving the flux solution in the filter from the first direction; receiving a gas in the filter from a second direction opposite to the first direction; flexing the portion of the filter media outwards from the space upon receipt of the gas; and removing the filter cake from the filter media based on flexing the portion of the filter media outwards.

A twenty fourth embodiment can include the method of the twenty third embodiment, wherein the filter comprises: a tube including perforations; the filter media positioned concentrically around the tube; and one or more spacers positioned between the tube and the filter media, wherein a space is created between the tube and the filter media when the flux solution is received from the first direction;

A twenty fifth embodiment can include the method of the twenty third embodiment, wherein the filter comprises: a plurality of tubes, each tube comprising perforations; and the filter media, wherein the filter media is positioned concentrically around the tubes to form a space between two tubes and a portion of the filter media.

A twenty sixth embodiment can include the method of any one of the twenty third to twenty fifth embodiments, further comprising: drying the filter cake with the gas prior to flexing the portion of the filter media outwards.

A twenty seventh embodiment can include the method of any one of the twenty third to twenty sixth embodiments, wherein the filter further comprises: at least one tube, and a reinforcement core positioned within the at least one tube, wherein the reinforcement core at least partially extends along a length of the at least one tube and includes portions to support the at least one tube and prevent deformation of the at least one tube.

A twenty eighth embodiment can include the method of the twenty seventh embodiment, wherein the reinforcement core includes recesses to receive filtered fluid.

A twenty ninth embodiment can include the method of any one of the twenty third to twenty eighth embodiments, wherein the filter further comprises: at least one tube, and a volume reducer positioned within the at least one tube, wherein the volume reducer includes an internal chamber and extends at least partially along a length of the at least one tube, wherein the internal chamber does not receive filtered fluid.

A thirtieth embodiment can include the method of any one of the twenty third to twenty ninth embodiments, further comprising: introducing a filtrate into the flux solution within the feed tank after removing the filter cake from the filter media; passing the flux solution with the filtrate through the filter media; forming a second filter cake on the filter media based on passing the flux solution with the filtrate through the filter media; and reintroducing the flux solution with the precipitate to the filtering vessel after forming the second filter cake.

The particular embodiments disclosed above are illustrative only, as the embodiments may be modified and practiced in different manners apparent to those skilled in the art having the benefit of the teachings herein. It is therefore evident that the particular embodiments disclosed above may be altered or modified and all such variations are considered within the scope of the present disclosure.

What is claimed is:

1. A method of filtering a fluid, the method comprising:
receiving a flux solution in a feed tank;
introducing an oxidizer into the flux solution in the feed tank;
forming a precipitate in the flux solution within the feed tank in response to introducing the oxidizer;
passing the flux solution with the precipitate to a filtering vessel containing a filter comprising a filter media;
receiving the flux solution with the precipitate in the filter from a first direction;
flexing a portion of the filter media inward into the space based on receipt of the flux solution with the precipitate;
accumulating a filter cake on the filter media in response to receiving the flux solution in the filter from the first direction;
receiving a gas in the filter from a second direction opposite to the first direction;
flexing the portion of the filter media outwards from the space upon receipt of the gas; and
removing the filter cake from the filter media based on flexing the portion of the filter media outwards.

2. The method of claim 1, wherein the filter comprises:
a tube including perforations;
the filter media positioned concentrically around the tube; and
one or more spacers positioned between the tube and the filter media, wherein a space is created between the tube and the filter media when the flux solution is received from the first direction.

3. The method of claim 1, wherein the filter comprises:
a plurality of tubes, each tube comprising perforations; and
the filter media, wherein the filter media is positioned concentrically around the tubes to form a space between two tubes and a portion of the filter media.

4. The method of claim 3, further comprising:
drying the filter cake with the gas prior to flexing the portion of the filter media outwards.

5. The method of claim 3, wherein the filter further comprises: a reinforcement core positioned within each of the plurality of tubes, wherein each reinforcement core at least partially extends along a length of a corresponding one of the plurality of tubes and includes portions to support the corresponding tube and prevent deformation of the corresponding tube, and wherein each reinforcement core includes recesses to receive filtered fluid.

6. The method of claim 3, further comprising:
introducing a filtrate into the flux solution within the feed tank after removing the filter cake from the filter media;
passing the flux solution with the filtrate through the filter media;
forming a second filter cake on the filter media based on passing the flux solution with the filtrate through the filter media; and
reintroducing the flux solution with the precipitate to the filtering vessel after forming the second filter cake.

7. The method of claim 6, wherein the precipitate comprises an iron compound.

8. The method of claim 7, wherein the oxidizer comprises hydrogen peroxide, chlorine dioxide, ozone, potassium permanganate or any combination thereof.

9. The method of claim 6, wherein the oxidizer comprises hydrogen peroxide, chlorine dioxide, ozone, potassium permanganate or any combination thereof.

10. The method of claim 3, wherein the precipitate comprises an iron compound.

11. The method of claim 10, wherein the oxidizer comprises hydrogen peroxide, chlorine dioxide, ozone, potassium permanganate or any combination thereof.

12. The method of claim 3, wherein the oxidizer comprises hydrogen peroxide, chlorine dioxide, ozone, potassium permanganate or any combination thereof.

13. The method of claim 1, further comprising:
drying the filter cake with the gas prior to flexing the portion of the filter media outwards.

14. The method of claim 1, wherein the filter further comprises: at least one tube, and a reinforcement core positioned within the at least one tube, wherein the reinforcement core at least partially extends along a length of the at least one tube and includes portions to support the at least one tube and prevent deformation of the at least one tube.

15. The method of claim 14, wherein the reinforcement core includes recesses to receive filtered fluid.

16. The method of claim 1, wherein the filter further comprises: at least one tube, and a volume reducer positioned within the at least one tube, wherein the volume reducer includes an internal chamber and extends at least partially along a length of the at least one tube, wherein the internal chamber does not receive filtered fluid.

17. The method of claim 1, further comprising:
introducing a filtrate into the flux solution within the feed tank after removing the filter cake from the filter media;
passing the flux solution with the filtrate through the filter media;
forming a second filter cake on the filter media based on passing the flux solution with the filtrate through the filter media; and
reintroducing the flux solution with the precipitate to the filtering vessel after forming the second filter cake.

18. The method of claim 1, wherein the precipitate comprises an iron compound.

19. The method of claim 1, wherein the oxidizer comprises hydrogen peroxide, chlorine dioxide, ozone, potassium permanganate or any combination thereof.

20. The method of claim 1, wherein the precipitate comprises an iron compound, and wherein the oxidizer comprises hydrogen peroxide, chlorine dioxide, ozone, potassium permanganate or any combination thereof.

\* \* \* \* \*